(12) United States Patent
Cifelli

(10) Patent No.: US 10,479,602 B2
(45) Date of Patent: Nov. 19, 2019

(54) MODULAR BASE FOR FORMING INSTALLATIONS AND METHOD FOR STORAGE BY MEANS OF STACKING AND MOVEMENT OF CASES

(71) Applicant: Carmine Alexandre Cifelli, Sao Paulo (BR)

(72) Inventor: Carmine Alexandre Cifelli, Sao Paulo (BR)

(*) Notice: Subject to any disclaimer, the term of this patent is extended or adjusted under 35 U.S.C. 154(b) by 337 days.

(21) Appl. No.: 15/511,230

(22) PCT Filed: Sep. 17, 2015

(86) PCT No.: PCT/BR2015/000142
§ 371 (c)(1),
(2) Date: Mar. 14, 2017

(87) PCT Pub. No.: WO2016/041035
PCT Pub. Date: Mar. 24, 2016

(65) Prior Publication Data
US 2017/0313513 A1    Nov. 2, 2017

(30) Foreign Application Priority Data

Sep. 18, 2014   (BR) .......................... 1020140231544

(51) Int. Cl.
*B65G 1/04*    (2006.01)
*B65G 1/06*    (2006.01)
(Continued)

(52) U.S. Cl.
CPC .............. *B65G 1/06* (2013.01); *B65G 1/04* (2013.01); *B65G 1/0471* (2013.01); *G06N 3/008* (2013.01);
(Continued)

(58) Field of Classification Search
CPC .............................. B65G 1/0471; B65G 1/04
See application file for complete search history.

(56) References Cited

U.S. PATENT DOCUMENTS

| 2,701,065 A | 2/1955 | Bertel |
| 4,007,843 A | 2/1977 | Lubbers et al. |
| (Continued) | | |

FOREIGN PATENT DOCUMENTS

| DE | 202014102274 U1 | 6/2014 |
| EP | 0767113 A2 | 4/1997 |
| (Continued) | | |

*Primary Examiner* — Jonathan Snelting
(74) *Attorney, Agent, or Firm* — Hoglund & Pamias, PSC; Roberto J. Rios

(57) ABSTRACT

Of the type capable of being combined side by side with other similar units and compose an installation for storage, movement and dispatching of several volumes which can be packaged in boxes which are stacked on each module, each base comprising a structural module (1) with three functional sections that constitute real pavements, one lower (2) referred as ground floor, one intermediate defined as first floor (3) and one upper defined as support level (4), the latter has support locks (5) for the stacked boxes (6); each one of the two pavements (2 and 3) are equally provide with four rails segments (7) and (8), on which work at least one movement robot (10) and one lifting robot (9); all this set is combined with other equal units fitted on all or any of its four sides, this combination also coincides with the alignment between all the rails (7) and (8) by configuring paths in the four directions of each structural module and which constitutes routes for the robots (9 and 10); said robots combine to remove the boxes (6) from each stack to place it on another base or to send it in anywhere point of the perimeter of the installation for dispatch.

17 Claims, 31 Drawing Sheets

(51) Int. Cl.
    *G06N 3/00*    (2006.01)
    *G06N 3/04*    (2006.01)
    *B65G 1/00*    (2006.01)

(52) U.S. Cl.
    CPC ............... *G06N 3/04* (2013.01); *B65G 1/00*
                       (2013.01); *G06N 3/00* (2013.01)

(56) References Cited

U.S. PATENT DOCUMENTS

| | | |
|---|---|---|
| 4,415,975 A | 11/1983 | Burt |
| 5,314,285 A * | 5/1994 | Lai .................... E04H 6/22 |
| | | 414/236 |
| 6,913,434 B1 | 7/2005 | Mannikko |
| 6,974,293 B2 * | 12/2005 | Stokes ................ E04H 6/22 |
| | | 414/227 |
| 2003/0228208 A1 * | 12/2003 | Grond ................ B65G 1/0471 |
| | | 414/267 |
| 2006/0018738 A1 * | 1/2006 | Yen .................... E04H 6/22 |
| | | 414/234 |
| 2007/0276535 A1 | 11/2007 | Haag |
| 2014/0072391 A1 | 3/2014 | Del Popolo |
| 2014/0086714 A1 | 3/2014 | Malik |

FOREIGN PATENT DOCUMENTS

| | | |
|---|---|---|
| JP | 2009040554 A | 2/2009 |
| KR | 20140066529 A | 6/2014 |
| KR | 20140072239 A | 6/2014 |
| NO | 20121488 A1 | 6/2014 |
| WO | WO1998049075 A1 | 11/1998 |
| WO | WO2012127102 A1 | 9/2012 |
| WO | WO2013167907 A1 | 11/2013 |

* cited by examiner

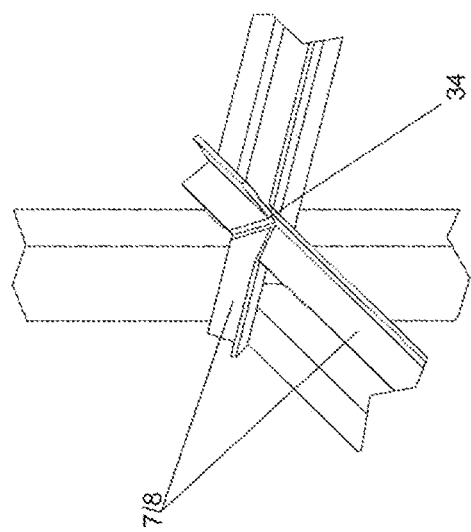
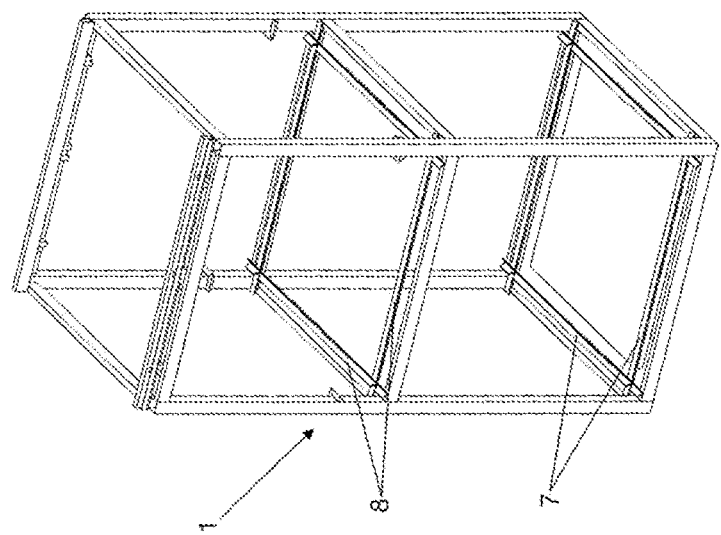
FIG. 14

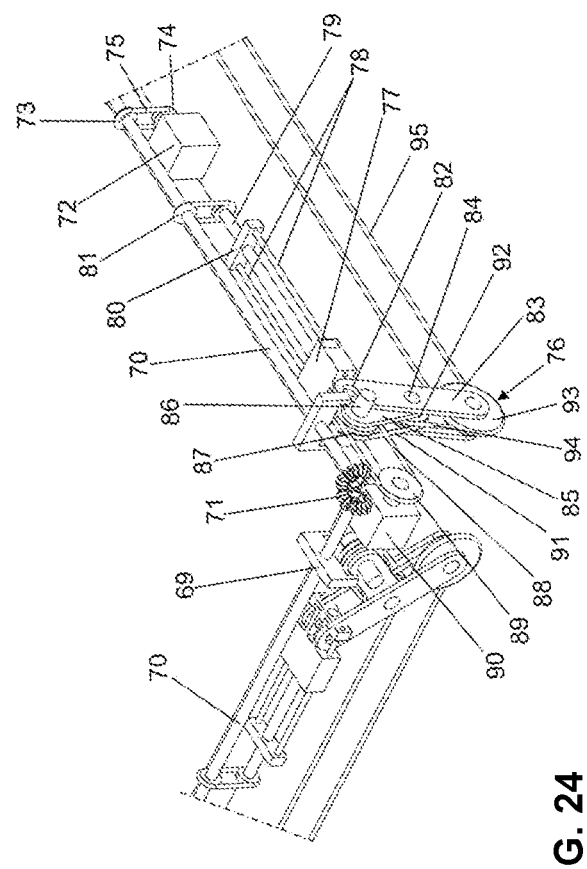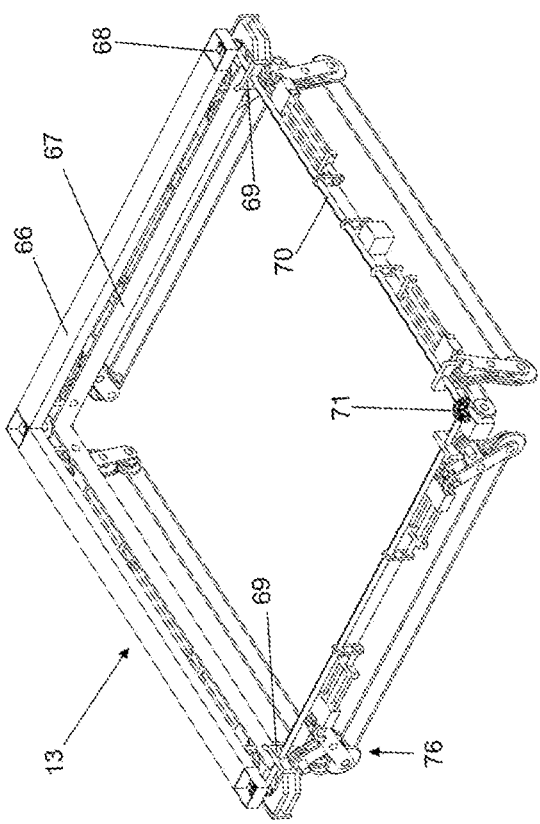
FIG. 24

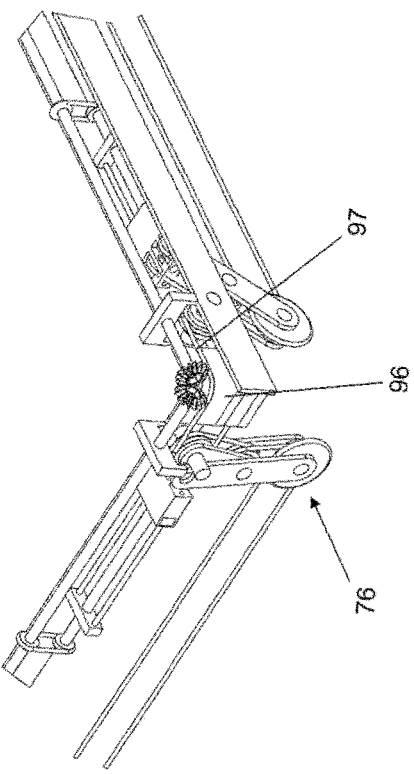
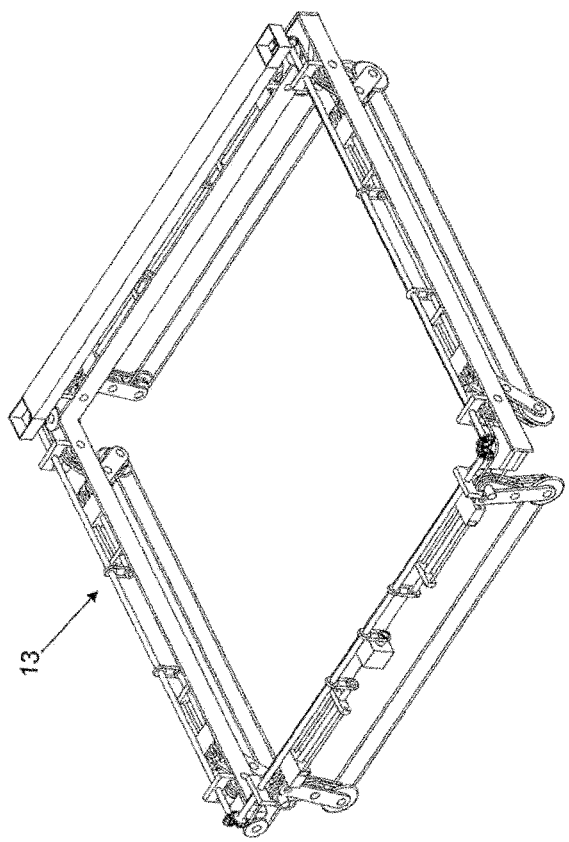
FIG. 25

MODULAR BASE FOR FORMING INSTALLATIONS AND METHOD FOR STORAGE BY MEANS OF STACKING AND MOVEMENT OF CASES

FIELD OF INVENTION

More particularly the present invention relates to a structure in parallelepipedic tower shape, with square or rectangular base, which constitutes a modular unit that can be adjusted side by side with other units of the same type, which makes it possible to compose a variable installation, where each unit or base presents three functional details defined along its height and, for this purpose, each tower presents one ground floor, one first floor above the previous one and one functional top. The ground floor and the first floor are equally provided with tracks, while the top is a point of support for stacked boxes or containers. On the ground floor works a robot defined as lifting type, while above the same, on the first floor, works a robot defined as movement type. In this sense, pursuant an innovative method, the stacked boxes are moved in the vertical direction by the first lifting robot, whose lift overpass the movement robot to perform this function, which allows the movement of the first bottom box supported on the top of the base up to the first floor and over the movement robot. Logically, such displacement of the first box from the bottom to up occurs along with the driving of locks and, thus, when the stack of boxes is moved down such locks are released and at the same moment wherein the first box from the bottom to up found support over the movement robot, the other boxes on the top of the base are maintained stable by the locks. Therefore, the box over the movement robot can be moved horizontally in any of the four directions of each base and be relocated under other stack of boxes or moved over to any point of the first floor at the perimeter of the installation to be removed or for removal of the volumes contained in their interior. The two robots may freely move in the four directions of each base, consequently the stacks of boxes can be moved to any point of the installation. The combination of all these movements is managed by specific software and make it possible to automatically manage the whole installation, making it ideal for any segment which, for one reason or another, requires efficient means for strict control of a large number of volumes, mainly for carrying out the following operations: receiving, classification, storage, dispatch, distribution and other operations that may characterize an efficient logistic model for storage and handling of different volumes, which is applied in different segments, whether commercial or industrial.

STATE OF ART

Currently there are different facilities to meet practically the same services, in the other words, receiving, storage, movement and distribution of various volumes, including the stacking method and use of robots, all managed by software and other automation details, such as is taught for example in the documents: DE202014102274, EP0767113A2, JP2009040554A, KR20140066529A, KR20140072239A, N020121488, U.S. Pat. No. 2,701,065, US004007843, US004415975, U.S. Pat. No. 6,913,434, US2014072391A1, US2014086714A1, US20070276535, WO9849075A1, WO2012127102A1, WO2013167907A1 e WO2013167907A1. All of them with its constructive particularities, some for really heavy and stacked individual loads and other for several volumes packaged in boxes that are stacked and in these instances, the volumes are relatively lightweight and small. Logically each known system presents their technical advantages and corresponding practices to the commercial or industrial segments that, for one reason or another, their logistics improves with the use of this type of installation.

Over time, it was noted that the known facilities and methods could be improved, not only as regards the actual installation, notably the structures and means for moving the robots, but also in regard to the movement method of the stacked volumes, whether unitary or in the form of boxes, including the containers, because in most current systems, the entire robotic system moves in the plane formed on the top of the installation. In this condition, all horizontal movement of the volumes is carried out in the plane or top of the installation, which generates a series of limitations. The movement of the volumes at the top of the installation is performed by some systems, such as those taught in the documents: WO2013167907A1, WO2012127102A1 e WO9849075A1, however there are other options of movement by the base of the set, but in most cases a specific robot does the displacement and the elevation of the load until the determined niche.

Therefore, in all systems, the same robot executes the elevation and the displacement of the volume promoting its withdrawal from a place and moving it to another place.

A disadvantageous aspect in conventional installations is the structural complexity of the installation, wherein the height, width and depth are predetermined to contain a maximum number of boxes or the stacked volumes, as example we can cite WO2013167907A1, wherein structure already has a predetermined height, forming several stacking columns, side by side, wherein each column is determined by four vertical profiles, as also each column constitutes means for stacking several boxes. In this case, all the columns have the same height and, with this, on the top of them is formed a horizontal plane with several tracks that intersect and on which the traffic of robots occurs, each with means so that only the first box from top to the bottom of each column can be hoisted and displaced up to other column, where it is lowered and so on. With such movements, a set of robots in the upper level works for the movement of the stacked boxes in each column. Although in this case the system presents operating efficiency, it was noted that the installation requires a predetermined structure for each project that, although it is possible to be enlarged, it has been noted that complications that requires full stop of the entire system occur. On the other hand, it is also observed that the manufacturing cost and facilities assembly with plane top for the movement of the volumes are really considerable, since each stack of boxes is kept inside a column or tower with resources to the support also of the top or of the plane of movement of the robots.

A disadvantageous detail in other systems is the fact that the robot is responsible for the vertical and horizontal displacement of each volume, consequently this generates complexity and a larger number of robots.

There are other similar embodiments for carrying out the same work, those that have corridors with a plurality of shelves and robots that displace in such corridors, wherein each robot also includes lifting means to move vertically the load, which allows to place it in a certain local or niche, remove it and transport it to another place, either from storage or expedition of the volume to the recipient.

Therefore, in the known facilities, although they are efficient, it was noted that some manufacturing costs and maintenance and management costs are still considerably high, even so the slowness of many systems is an aggravating, not only because of the limited speed of the robots, as well as according to structural layouts, which always end up generating a management method that requires complex "routing", and in many cases, longer.

OBJECTIVES OF THE INVENTION

The first object of the invention is the characterization of a module in the base form so that over the same can be performed a stable self supporting stacking of several equal volumes, preferably in the form of boxes which in turn may contain one or more products (smaller volumes), forming a self-supporting stack resting exactly over each base. This stack is of the type that can have a variable amount of units and does not require the use of any complementary structure for its stability, since the own units or boxes, also capable of being called containers, are self supporting and allow several units to be stably stacked.

The second object of the invention is the definition of a modular base capable of being adjusted side by side with other like units, so that, according to the necessity of each project, the facility is able to grow towards the four sides of each base, forming a grille capable of being dimensioned to meets the logistics of each segment, be it industrial or commercial. Logically the modularity of each base competes to compose installations with variation in width and length, including irregular layouts.

Another object of the invention is the definition of a vertically elongated base defining three work sectors along its height: a horizontal top of support for the stack of boxes to be stocked and moved, and two pavements of circulation for two types of different robots, being one defined as ground floor for the movement of a robot defined as elevation robot and a first floor over the previous one for the movement of the other robot simply defined as movement robot.

The ground floor and the first floor are equally provided with tracks, while the top constitutes the point of support for stacked boxes or containers. On the ground floor works the robot of elevation, while above of the same in the first floor works the movement robot.

The stacked boxes are moved in the vertical direction by the robot of elevation that, for this purpose, presents a platform generically defined as lift capable of upwardly extending passing freely through the center of the movement robot until it reaches the bottom of the first stacked box. And, therefore, after driven a locking system, the stack of boxes stays supported over the lift which upon pickup provides means for that the first box stays supported over the movement robot, while the other boxes remain supported on the base, logically by the actuation of the locks. Therefore, such vertical displacement of the first lower box occurs in conjunction with the driven of the locks and thus, when the stack of boxes is downward displaced such locks are released and, at the time wherein the first box from bottom to up has found support over the movement robot, the second box immediately above and the other boxes over the top of the base are maintained stable by the locks.

The box supported over the movement robot can be displaced horizontally in any of the four directions of each base and be relocated under another stack of boxes, the moment wherein the elevation robot take action again inverting all the movements previously mentioned, however there is also the possibility of the movement robot displace the volume until a certain point or station in the perimeter of the installation, where the manual or automatic input of the box in the system occurs.

It is noted that the two movement and elevation robots are independent and can be on different routes by combining functionally at the right moment, all of which managed by a computerized central administered by specific software.

Therefore, the fact of the two robots have full freedom of movements in the four directions of each base allows each box of the stacks to be relocated for any point of the installation. As already mentioned, the combination of all these movements is managed by specific software and makes it possible automatically manage the entire installation, making it ideal for any segment that, for a reason or other, requires efficient means for strict control of a large number of volumes, mainly for the realization of the following operations: receiving, classification, storage, dispatch, distribution and other operations that may characterize an efficient logistic model for storage and movement of different volumes, which applies in different segments, be they commercials or industrials.

It is noted that the main object of the invention is provide an installation without all that structure for stability of the stacks of boxes or volumes to be stored and moved. Normally such structure is present in most facilities used for the same purpose. The elimination of the structure and the use of two distinct robots, one of elevating and one of movement, made it possible to considerably reduce the final cost of the product, but also made it possible the definition of a "STANDART UNIT", which is in fact the basic module that repeats side by side and allows that the installation grow or shrink in any of the four directions of the base, consequently at the end of the assembly, there are innumerable technical and practical advantages with respect to conventional systems, i.e.:

reduced cost for assembly of any facility;

the stacks of boxes are self supporting;

all the robots are moved in the lower plane said as ground floor, which facilitates greatly the input and the output of the boxes to the system in any one of the bases that defines the perimeter of the installation;

the fact that the elevation robot or lifting robot works on the ground floor allows all loads to be directly supported over the floor, in the other words, at the moment wherein a stack of boxes is moved vertically, the lifting robot presents means to have support over the floor and not over the tracks, thereafter said stack of boxes is vertically moved until the desired box stays positioned over the movement robot, consequently all load of the stack of boxes does not affect the running of the robot or over the tracks and structure, which allows a reduced sizing of the structure of the modular base;

unlike of the known installations, the stack of boxes is not limited by the structure, since each stack is self supporting and may presents a variable number of stacked boxes, which results in high storage density, greater space efficiency, more places of storage and considerable reduction of space occupied by the installation itself;

the combination of variable stacks of boxes and the singular movement of the same increases considerably the flexibility of maneuvers of all the boxes, either for allocation or for dispatch;

the fact that each base is modular makes it very simple to integrate a complete facility into any existing covered space, be it a warehouse, a pavement of a building and/or the like, wherein the facility fits even around a number of obstacles, such as for example, around pillars and other, as well as in places with very low clearance;

the modular aspect adopted for the project of the base provides all the means for defining a flexible layout;

the capacity of robots can vary for each project and even at necessary moment, the same facility can increase or decrease the quantity of robots depending on the flow of stock, which is important for certain seasons of the year;

presents low power consumption; and integral management by software and consequently always with all the information available in real time, inclusive with management reports, providing precision in the movement of the boxes, both in the input and output as well as in the storage and reallocation of the same, and further at any moment, it is possible to know the real stock provided by the system.

DESCRIPTION OF THE DRAWINGS

For a better understanding of the present invention, a detailed description thereof is given below, with references to the accompanying drawings:

FIG. 14 reproduces a perspective view of the structure of the modular base and an enlarged detail of the movement rails of the robots;

FIG. 24 reproduces an isometric view in upper angle of the trolley without some parts and an enlarged detail of one of its corners highlighting the driving mechanisms of the running system of said trolley;

FIG. 25 is an isometric view in upper angle of the trolley also without some parts and an enlarged detail of one of its corners highlighting the transmission of belts movements in one of the corners of the structure;

DETAILED DESCRIPTION OF THE INVENTION

Figure 1:
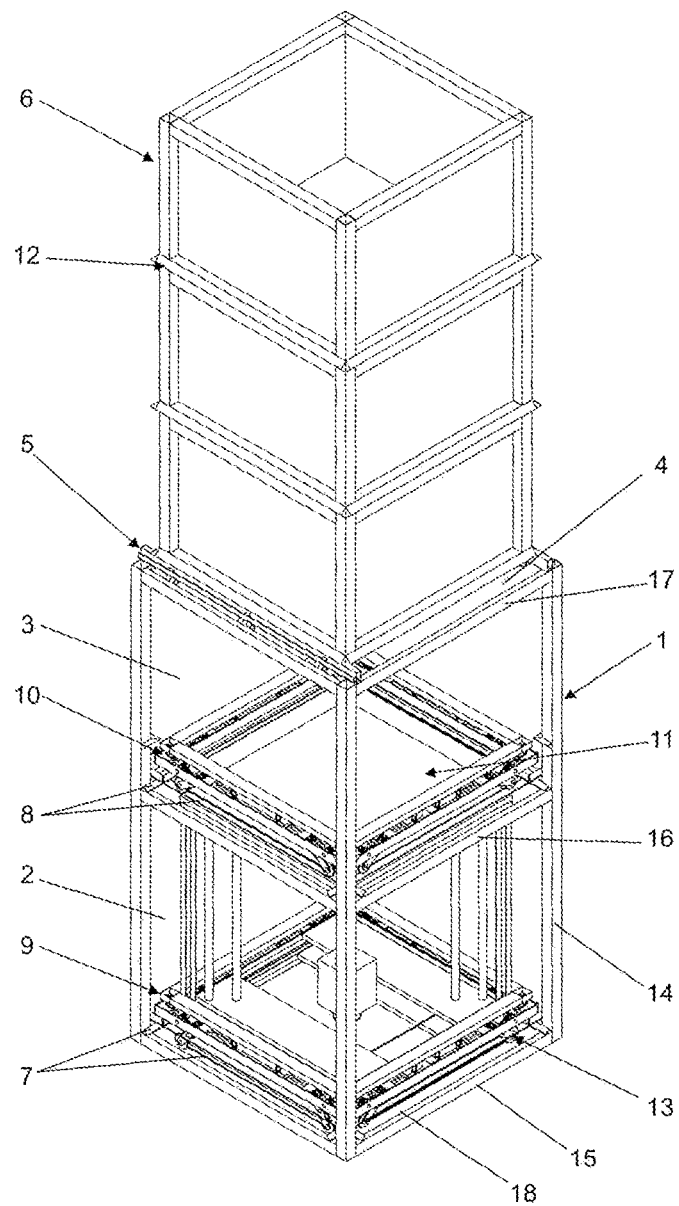
FIG. 1 illustrates an isometric view of the complete modular base, including the lifting robot, the movement robot and a stack of boxes to be moved.
Figure 2:
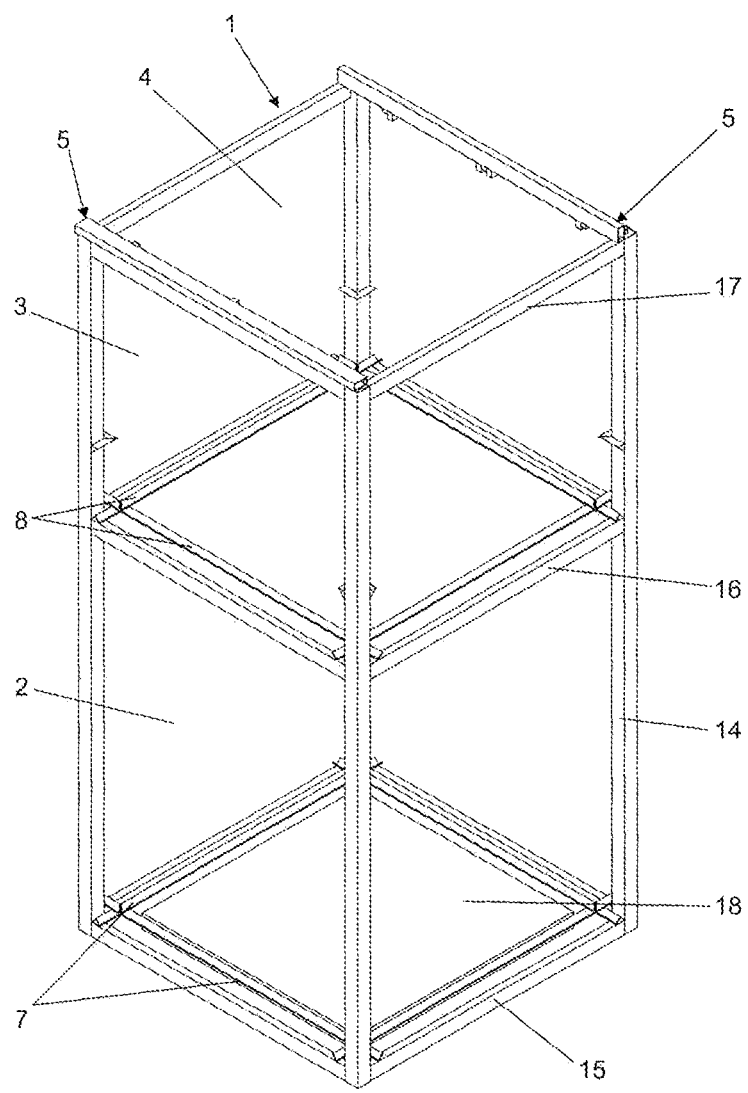
FIG. 2 represents a perspective in upper angle highlighting the structural part of the modular base.
Figure 3:
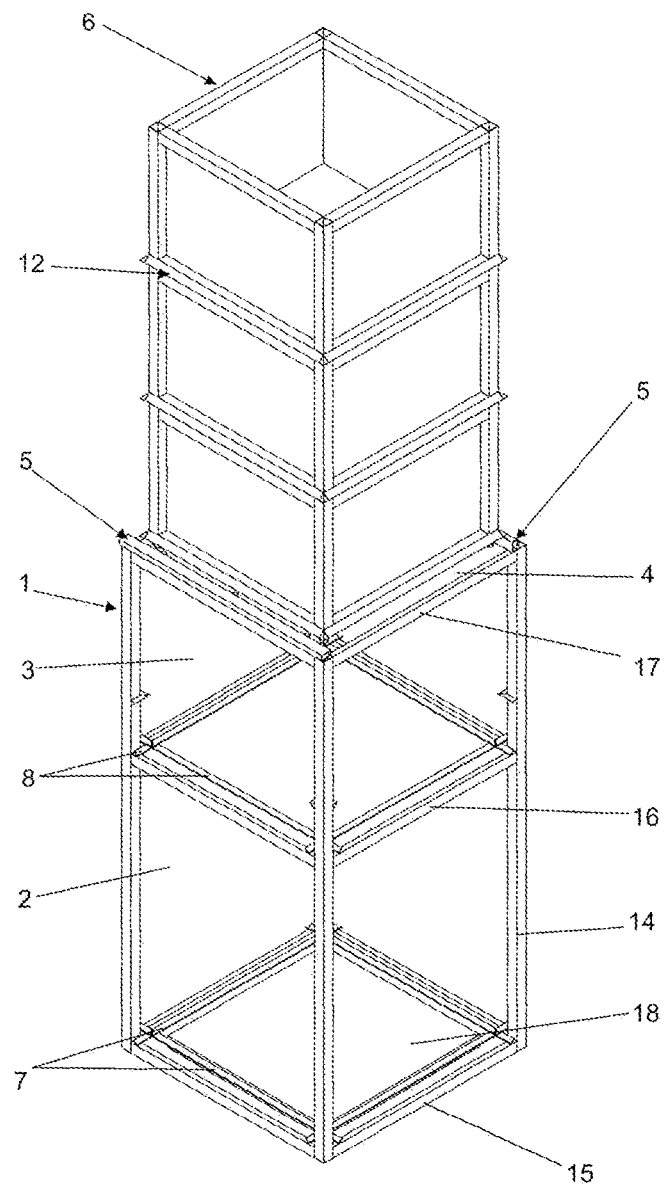
FIG. 3 shows another view in perspective same as above, however in this case, a stack of boxes is included over the base.
Figure 4:
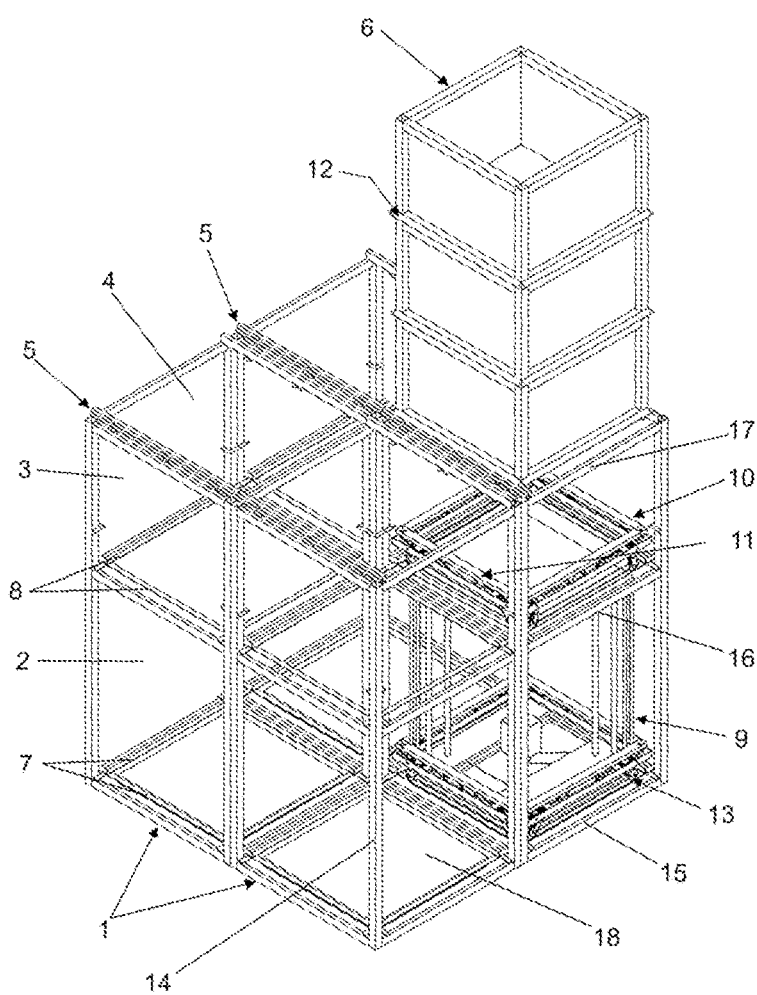
FIG. 4 is an isometric view exemplifying an installation with only 4 modular bases, highlighting the fact that each base is combined side by side with another equal.
Figure 5:
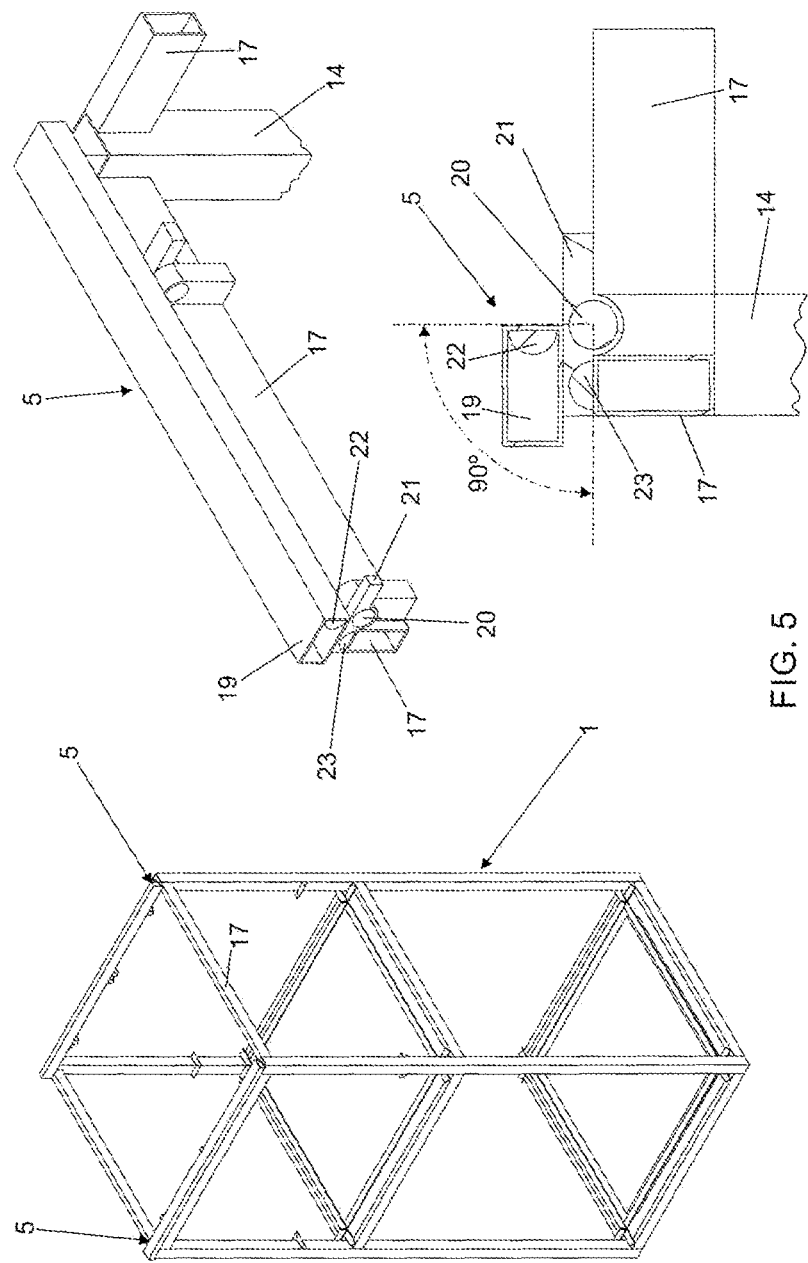
FIG. 5 exposes a perspective and two enlarged details showing the structure of the modular base and the upper support locks of the stack of boxes, and in this enlarged details, the locks are in the unlocked position.
Figure 6:
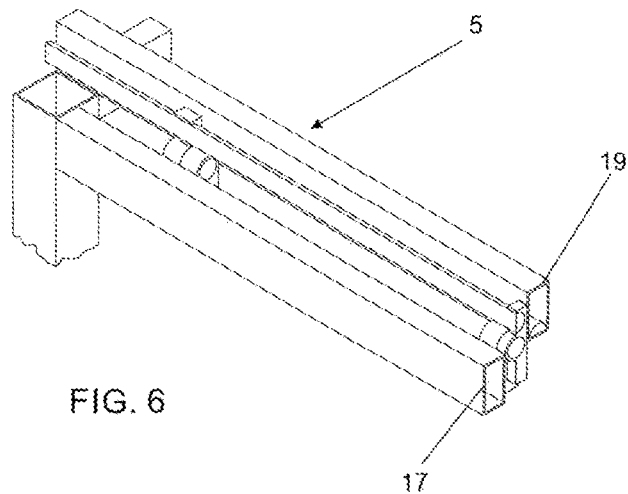
FIG. 6 reproduces a perspective detail of the lock in the locked position.
Figure 7:
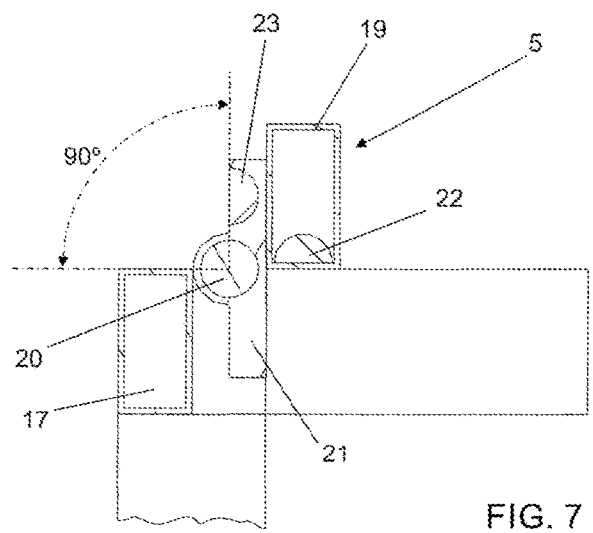
FIG. 7 is the same detail of the previous figure, however in cross-section.
Figure 8:
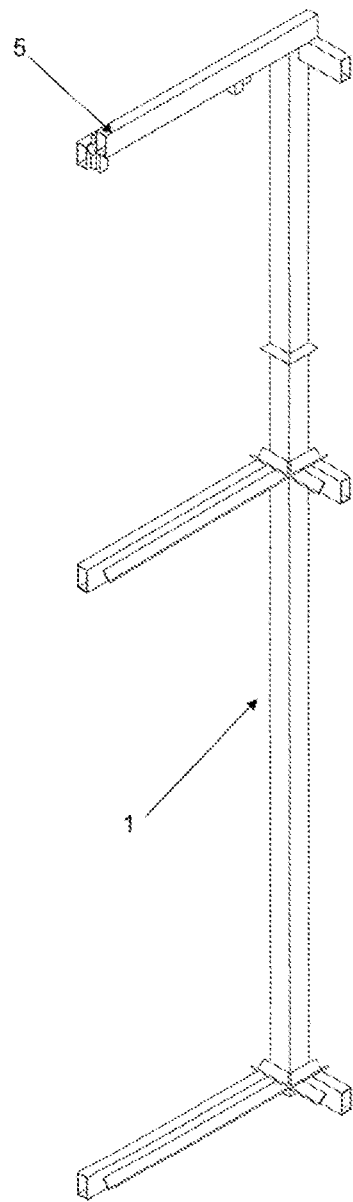
FIG. 8 shows a perspective detail of the same lock illustrated in the previous figure.
Figure 9:
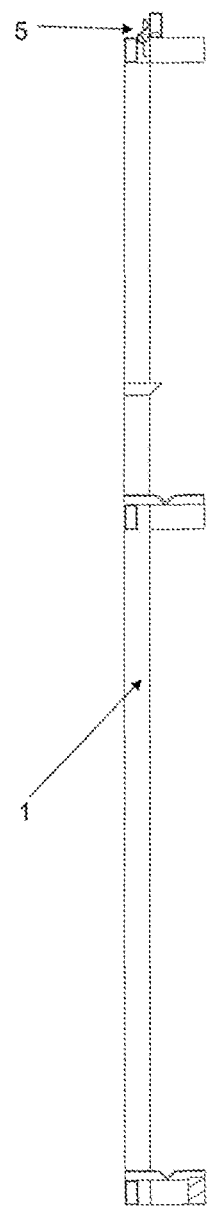
FIG. 9 represents the detail of the previous view in cross-section.

According to these illustrations and in their details, more particularly FIGS. 1 to 4, the present invention, MODULAR BASE FOR COMPOSING INSTALLATION FOR STORAGE BY STACKING AND HANDLING OF BOXES, is characterized by the fact that it comprises:

a structural module (1), parallelepiped and vertically elongated, having a square or rectangular base with three functional sections along its height which constitute real pavements, one lower (2) as ground floor, one intermediate defined as first floor (3) and one upper defined as support level (4);

the support level (4) having two opposing edges equipped with support locks (5) for stacked boxes (6);

the two pavements (2 and 3) are each equally provided with four rail segments (7) and (8);

on the rails (7) of the ground floor (2) works at least one lifting robot (9);

on the rails (8) of the first floor (3) works at least one movement robot (10);

said structural module (1) merges with other equal units adjusted to all or any of its four sides, this combination also coincides with alignment between all the rails (7) and (8) by creating ways in the four directions of each structural module and which constitute routes for the robots (9 and 10);

the box (6) is sized to freely pass from the support level (4) to the first floor (3) and for being supported on the movement robot (10);

the lifting robot (9) presents means (11) to freely pass through the center of the movement robot (10) and lowering and raising the stack of boxes (6);

the boxes (6) have means (12) of automatically driving the locks (5), suitable for releasing the stack of boxes (6) during the moment of the vertical movement;

the lifting robot (9) and the movement robot (10) are equally provided with trolley (13) with running system on four sides, all of which able of upward and downward movement and suitable so that the runnings system of two opposing sides stay suspended, while the other are placed over the corresponding rails (7 or 8), so that this movement may allow a 90 degree change of direction so that said robots (9 and 10) may move over said rails (7 and 8) according to any desired route.

Still referring to FIG. 1, each structural module (1) is formed by four tubular vertical column (14), one at each corner, interconnected by crossbars equally tubular (15), (16) and (17) forming the lower or ground pavement (2), the intermediate pavement or first floor (3) and the upper level (4), as well as the crossbars (15) and (16) constitute supports for the ends of the rails (7) and (8), while two opposing crossbars (17) form the supports for the locks (5) and further among the four crossbars (15) is located a support plinth (18) for the lifting robot (9).

As illustrated in the enlarged details of FIGS. 5 to 9, each lock (5) is formed by a rectangular tube bar (19) which extends along the corresponding crossbar (17), with which is interconnected by articulated points (20) and, further, by the lower part of each bar (19) there are solidary tips (21) which are hinged together with said bar, the joint is defined at two limited points in a radius of 90 degree, wherein the first said bar (19) stays (FIG. 5) almost juxtaposed over the corresponding bar (17), while the tips (21) lie horizontally inwardly, while in the second position (FIG. 7) said bar (19) is displace inwardly and both form a support bracket for the means (31) of the stacked boxes (6) and, further, each bar (19) has two additional center of mass (22) and (23) closely related to the center of the hinged points (20) so that said masses may change the center of gravity of each bar (19) maintaining it by gravity in the locked or unlocked position when it is moved to exceed the vertical center of the hinged points (20).

Figure 10:
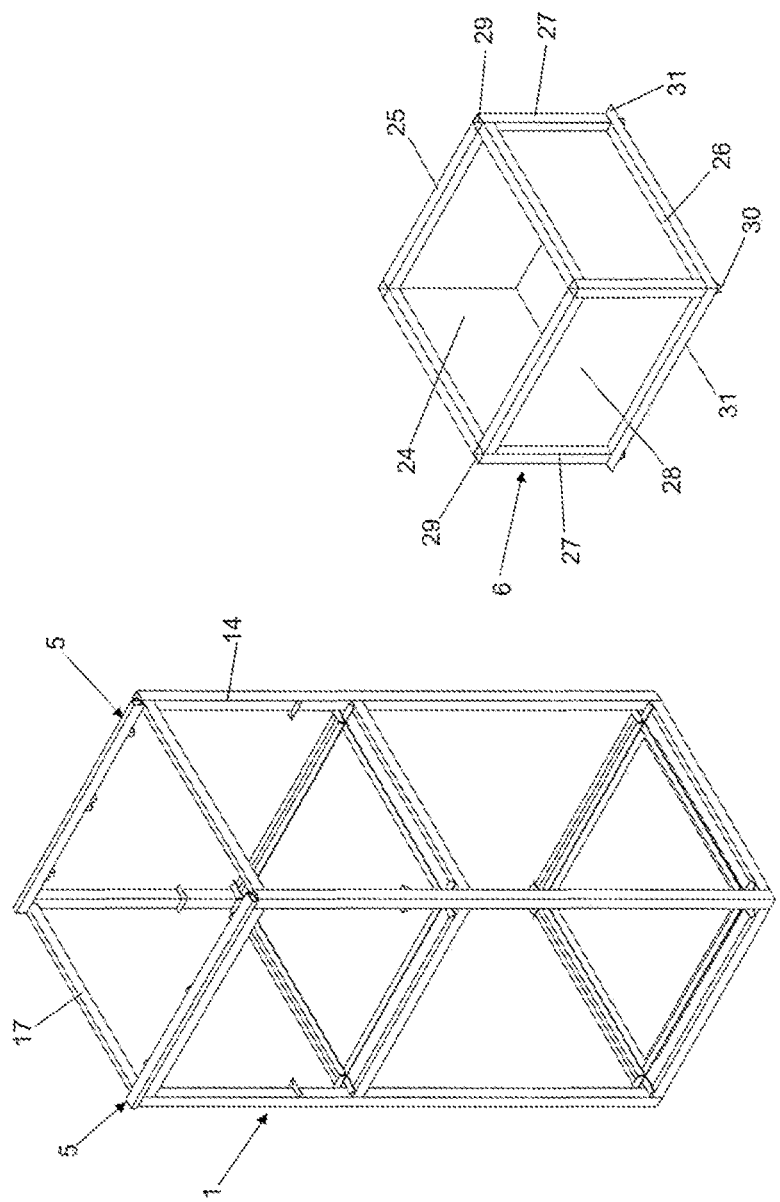
FIG. 10 shows a perspective highlighting the structure of the base and a stackable box.
Figure 11:
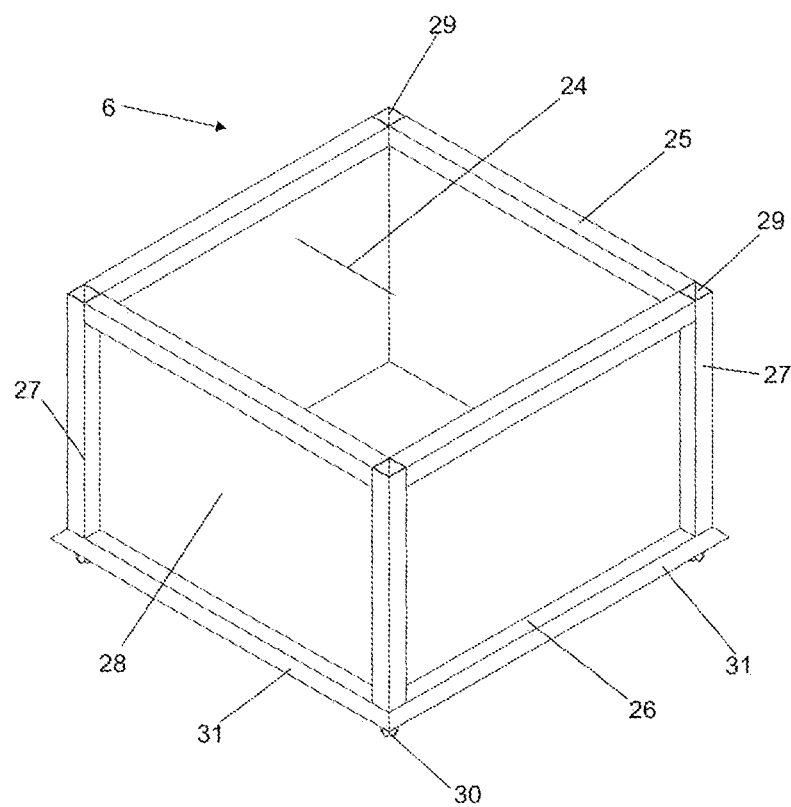
FIG. 11 illustrates an isometric view in upper angle only of a stackable box.
Figure 12:
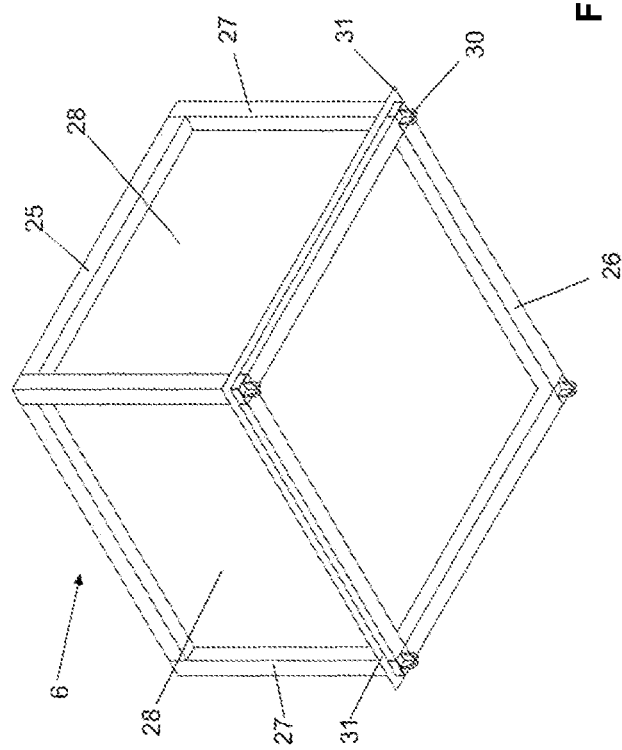
FIG. 12 an isometric view in lower angle only of a stackable box and an enlarged detail highlighting the male fitting of stacking between the units.
Figure 13:
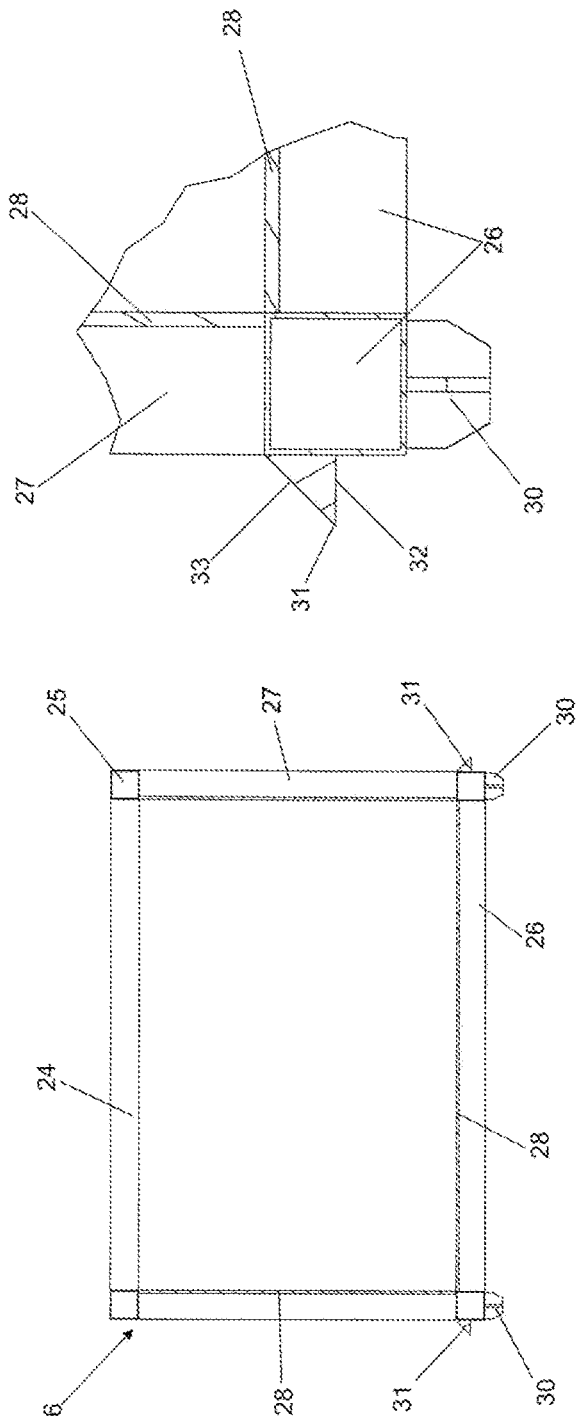
FIG. 13 exposes a cross lateral view of a stackable box and an enlarged detail highlighting the male fitting of stacking between the units.
Figure 15:
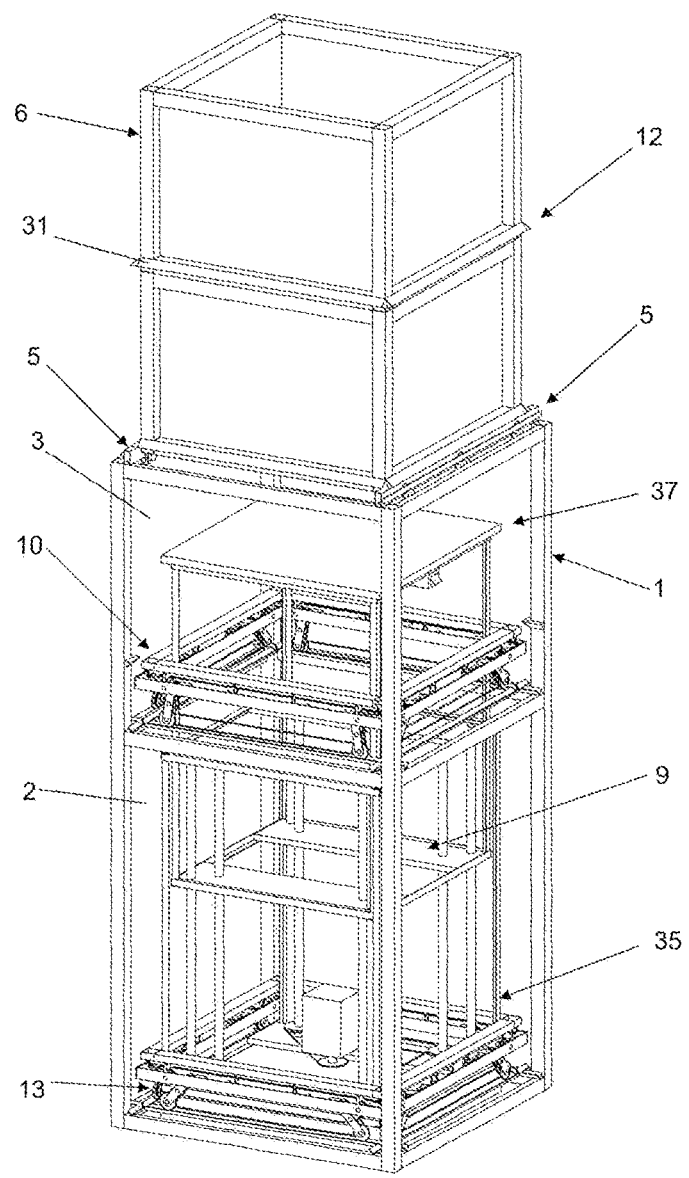
FIG. 15 is a perspective of a complete modular base showing the partially raised lifting robot.
Figure 16:
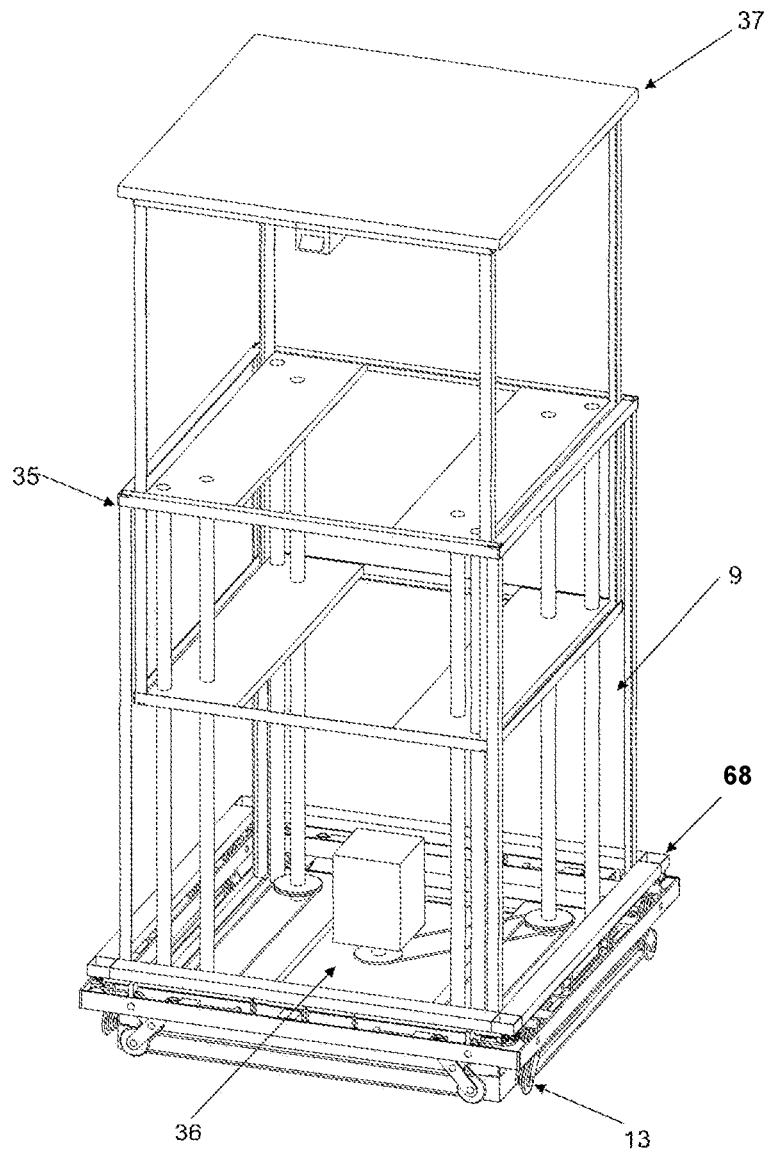
FIG. 16 shows a perspective view showing the lifting robot in upper angle.

Each box (6) is a stackable unit, seen in detail in FIGS. 10 to 12, where it is verified that each box has at least one open side (24), either upper or lateral, as also each box is formed by structure of square tubes forming an outer frame with an upper framework (25) and an lower framework (26), interconnected by column (27) at the four corners, all of which are combined for receiving closures by inner plates (28) and, further, the upper ends of the column (27) result in conducting fittings (29), while its lower ends have tips (30) which penetrate into the fittings (29) when said box is stacked with other similar units, as also the lower framework of each box (6) is externally contoured by a flap (31) with cuneiform section, the horizontal side (32) being downwardly and the inclined side (33) being the top, wherein the first constitutes point of support of each box (6) over the locks (5) and, further, the ramp part (33) also drives said locks when a box is displaced from the bottom to up.

The rails 7 and 8 are illustrate in detail in FIG. 14, where it is seen that they are angle bars positioned in "V" and are also cut in the same format in the crossing points (34).

The lifting robot (9) is illustrated in detail in FIGS. 15 to 18, whereby it is verified that it comprises a first structural part (FIGS. 15 and 16) defined as structural cage (35), whose height is sufficient to stay adjusted inside of the lower pavement (2) and has internally a driving mechanism (36) for a lifting set (37), movable in the vertical direction as if it were a piston, whose upper part presents compatible sizing to pass through the center of the movement robot (10) to lower or raise the stack of boxes (6) and to place or remove one of them over said movement robot (10), further, the lower part of the structural cage (35) are integrated with the trolley (13) so that the set can be displace in any one of the directions defined by the rails (7).

Figure 17:
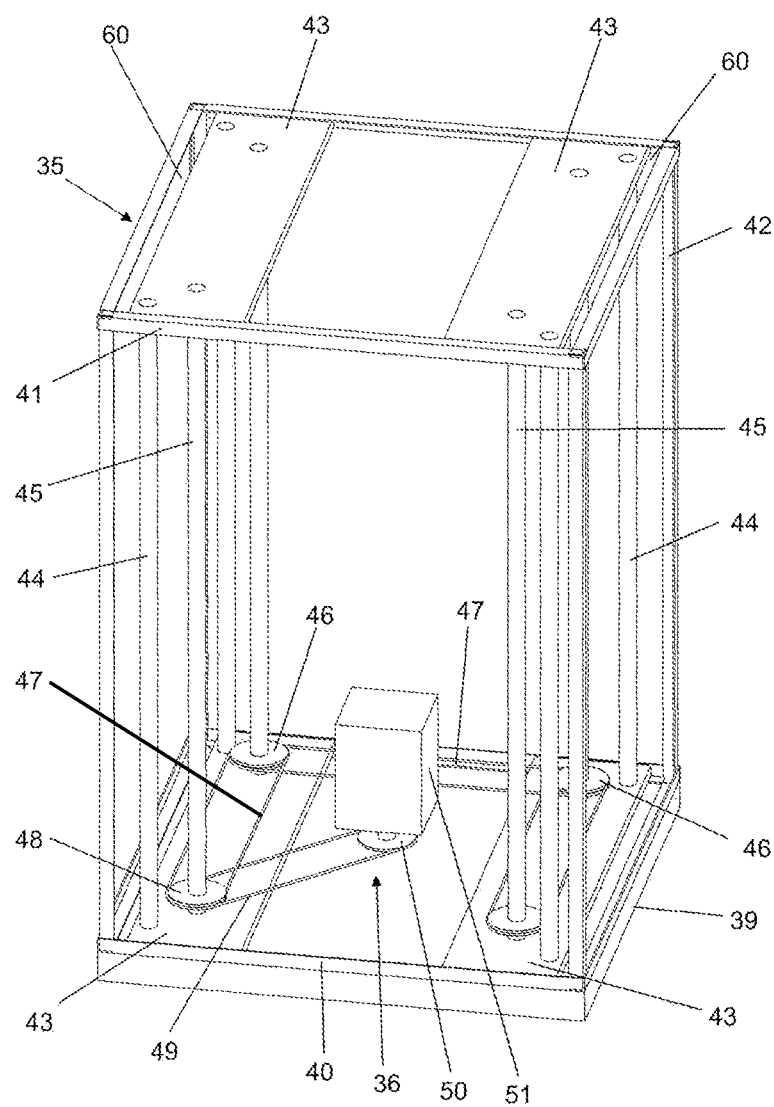
FIG. 17 represents a perspective only of the structure and of the driving mechanism of the lifting robot.

Referring to FIG. 17, the structural cage (35) is formed by a base (39) sized within the limits defined for support on the support plinth (18), while by the lower side is equipped by a frame of angle bars (40), which also repeat in the upper part forming other framework (41) interconnected with the first by other vertical angle bars (42), one in each corner, further the upper framework (41) receives plates (43) which also repeat over the base (39) and constitute fastening means for the drive mechanism (36) formed by vertical guides (44) and rotating screw shaft equally vertical (45), the latter with their lower ends provided with pulley (46) synchronized by belts (47), however one of them (48), also by means of belt (49), is coupled to another pulley (50) of an electric motor (51) able to rotate in two directions and promoting the simultaneous rotation of all of the screw shaft (45), on which the lifting set (37) is coupled.

Figure 18:
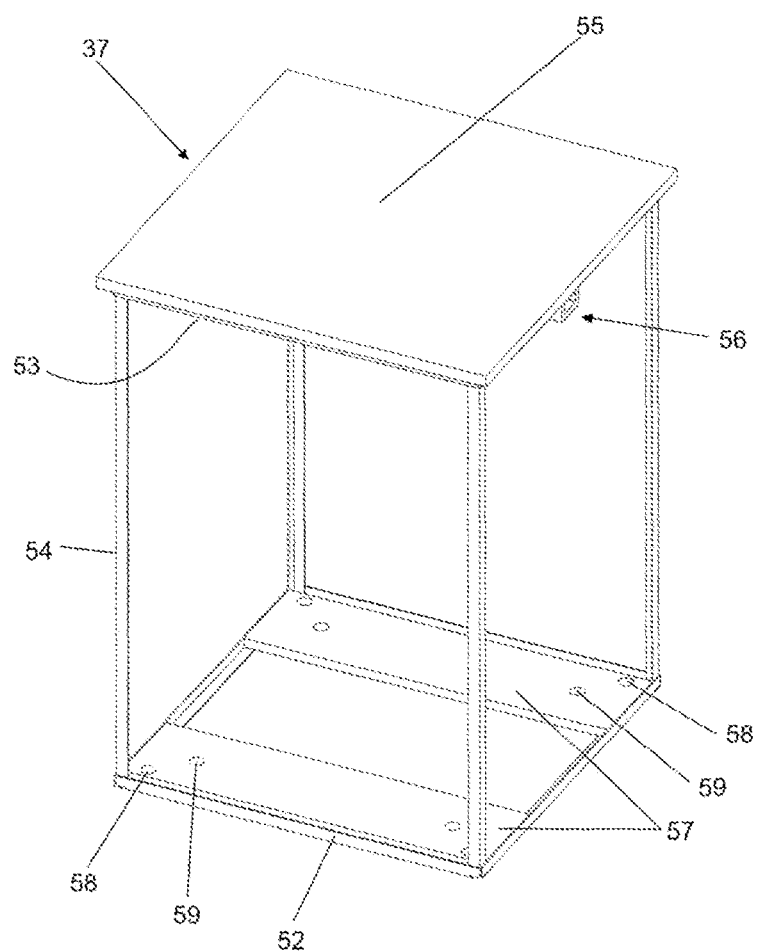
FIG. 18 shows an isometric view in upper angle only of the movable structure of the lifting robot.

The lifting set (37) is shown in detail in FIG. 18, whereby it is seen that it is formed by a structure defined by two frameworks of angle bars, one lower (52) and one upper (53) interconnected at the four corners by other vertical angle bars (54) and, further, the upper framework (53) includes a lid (55) and thereunder a locking and unlocking mechanism (56) of the locks (5), while the lower framework has plates (57) with smooth holes (58) and threaded holes (59), the first for sliding passage of the vertical guides (44) and the second for the rotating screw shaft (45), said lower framework (52) being positioned between the base (39) and the frame (41) of the structural cage (35), consequently the upper framework (53) and said lid (55) move above said upper frame (41), as well as the four vertical corners (54) of the lifting set (37) pass by interstices (60) existing in the corresponding parts of the structural cage (35).

Figure 19:
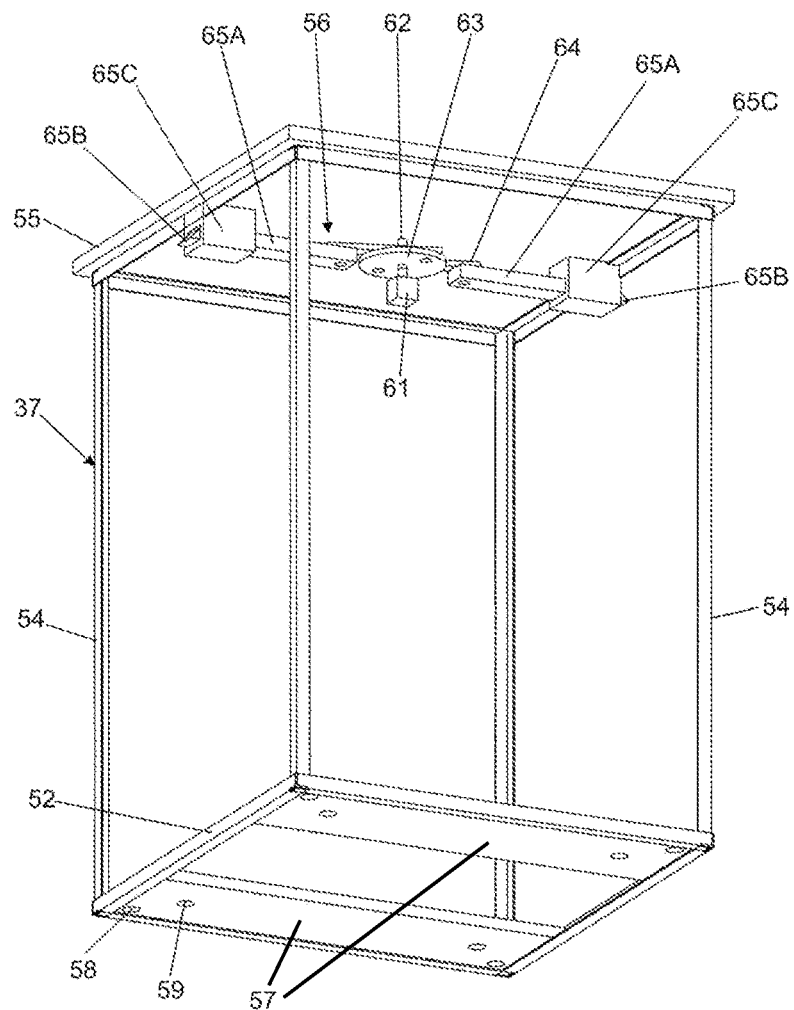
FIG. 19 represents an isometric view in lower angle only of the movable structure of the lifting robot highlighting the driving mechanism of the locks disposed under its lid.
Figure 20:
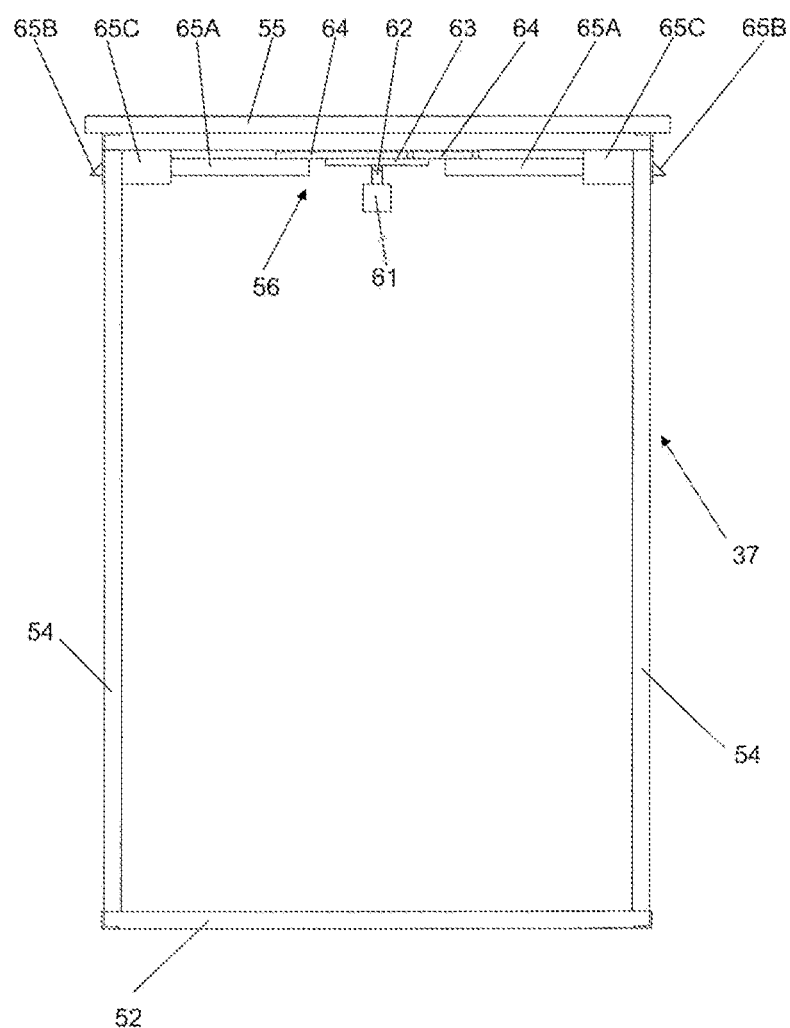
FIG. 20 shows a side view only of the movable structure of the lifting robot.
Figure 21:
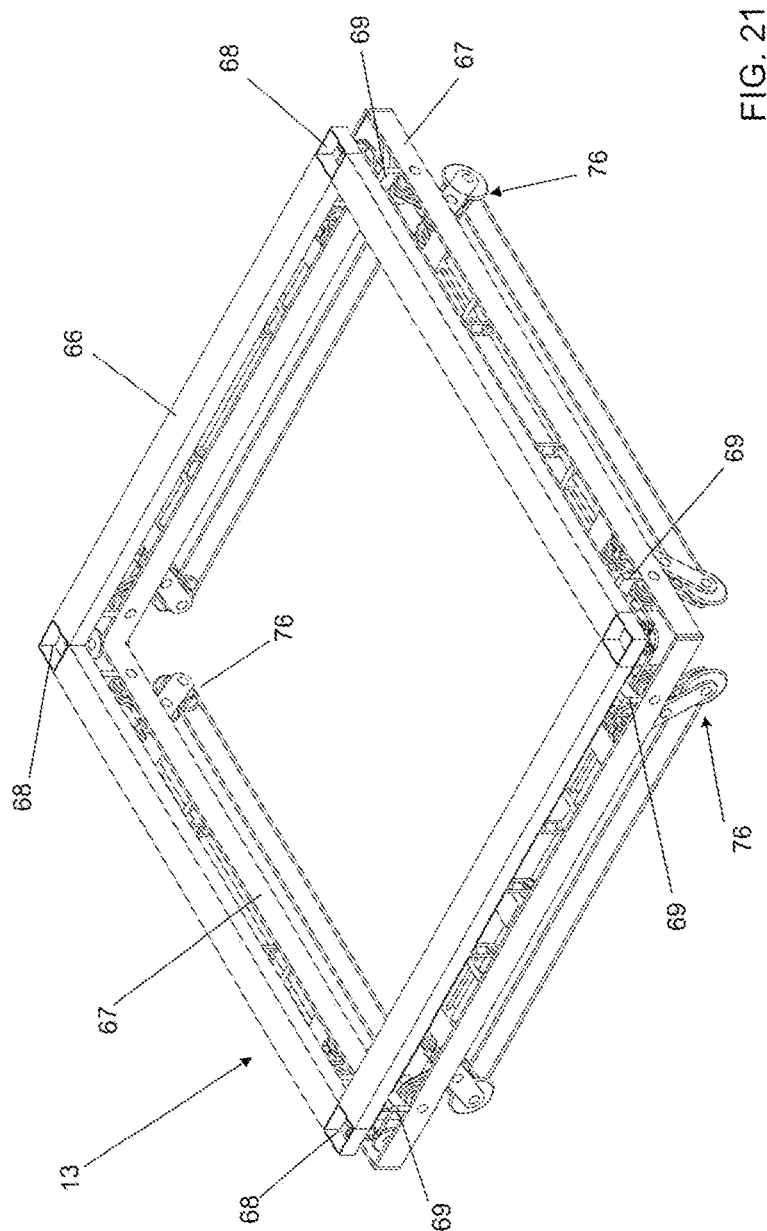
FIG. 21 illustrates an isometric view in upper angle highlighting the trolley used in the movement robot and the lifting robot.
Figure 22:
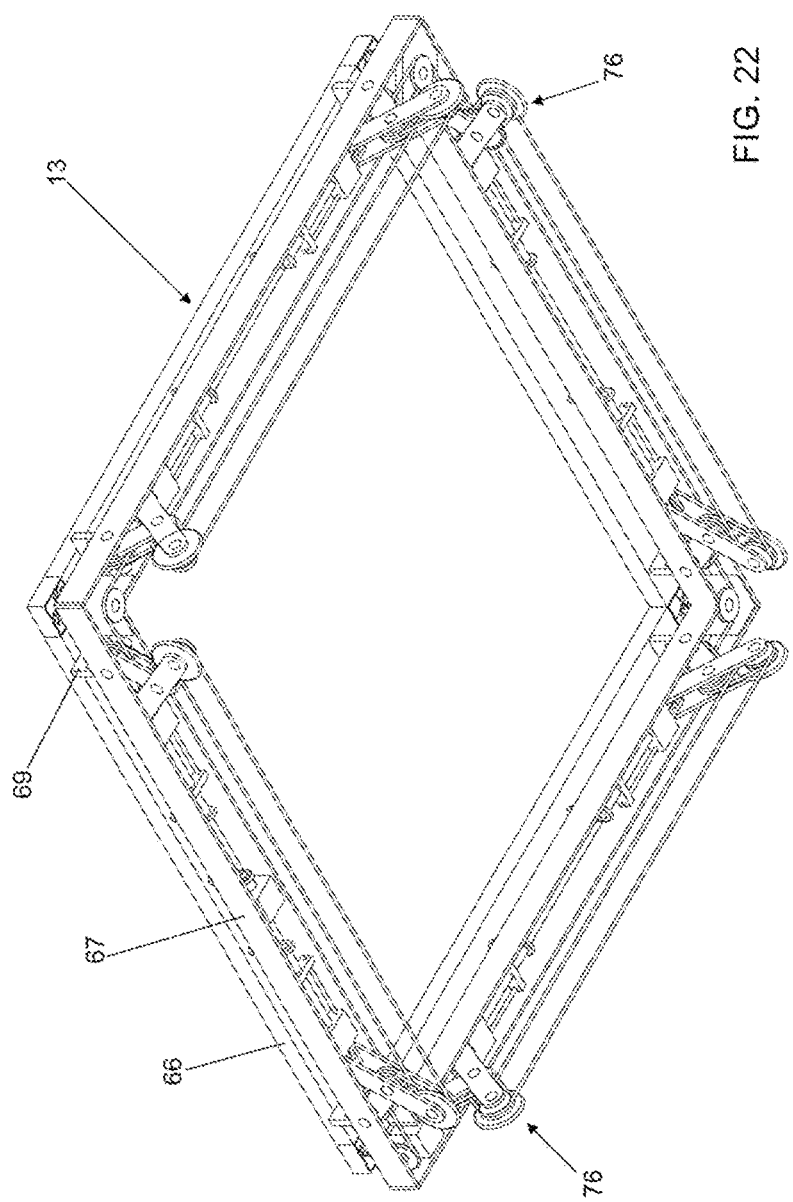
FIG. 22 is an isometric view in lower angle also highlighting the trolley used in the movement robot and the lifting robot.
Figure 23:
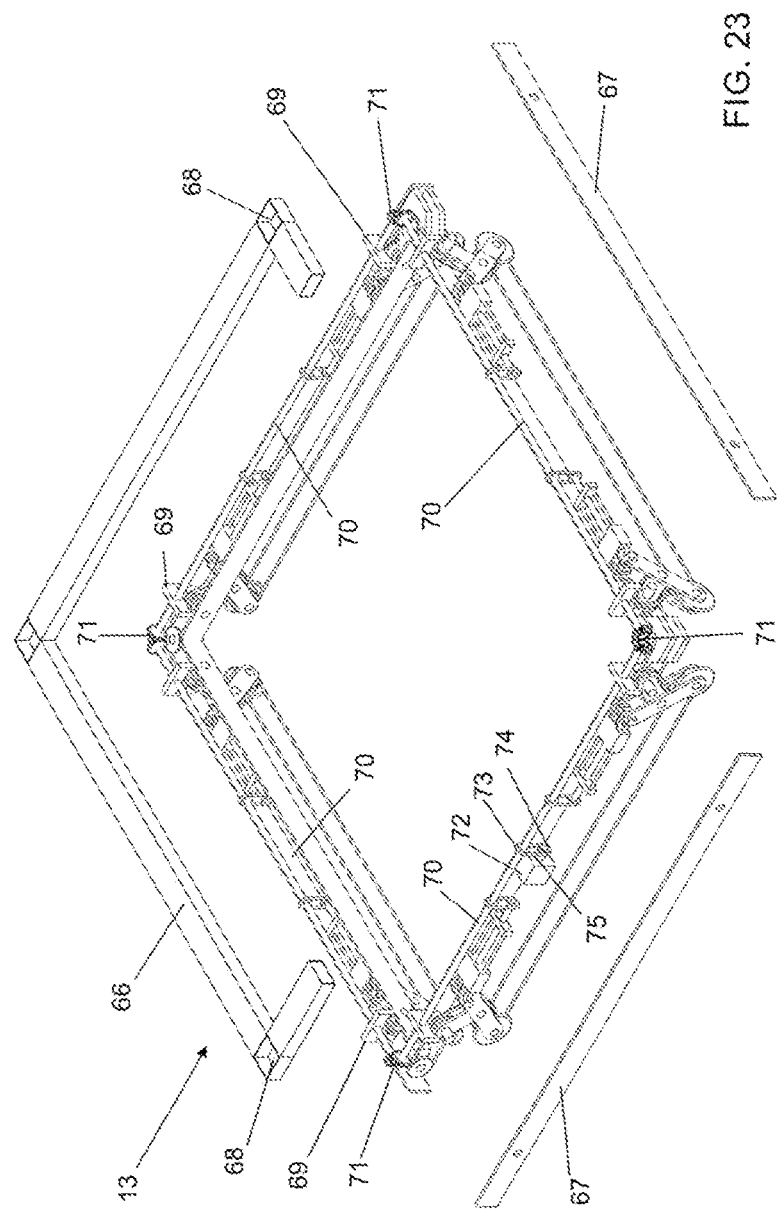
FIG. 23 exposes a partially exploded isometric view in upper angle highlighting some internal details of the trolley used in the movement robot and the lifting robot.

The locking and unlocking mechanism (56) is illustrated in detail in FIGS. 19 and 20, whereby it is seen that it comprises a servo motor (61) which, together with a central shaft (62), applies half turn in two directions in a disc (63), where the ends of two arms (64) are articulated and eccentrically fitted, whose opposing ends are also pivotally fitted in two radially opposing actuating nozzles (65A), having the distal ends being wedge-shaped (65B) and pierced in the sliding form in supports (65C) fixed under the lid (55), wherein said wedged tips (65B) are exposed or retracted when the servo motor (61) is drive, so that said wedge tips (65B) may perform against the locks (5) in order to move them to the unlocked position during the destacking; the locks (5) return to the locked position during the same descent of the stack by the contact of the flap (31) of the lower box (6) with the hinged tips (21) serving as a support for the box immediately above. During the stacking of a new box, the flaps (31) of that same box perform against the locks (5) in order to bring them to the unlocked position by releasing the passage and during the descent of the lifting set (37), the tips in wedge (65B) are actuated and act on the hinged tips (21) of the locks in the direction of bringing them into the locked position.

The lifting robot (9) and the movement robot (10) use the same trolley (13), illustrated in FIGS. 21 to 25, where it can be seen that it consists of a structure composed of two frameworks, a upper one of tube (66), and a lower one of parallel flat bars (67), wherein the first presents its corners with receptacles (68) for receiving the tips (30) of the boxes (6), this function only exists in the movement robot (10), but also this first tubular framework (66) is supported and fixed over spacer supports (69) which, in turn, fix the parallel flat bars framework (67) and, at the same time, all spacer supports (69) serve as bearings for the four axis of framework (70), one on each side, synchronized by the ends with the respective conical gears (71), as also one of these axes is driven by motor (72) with pulley (73 and 74) and belt (75) transmission, wherein all the axles (70) configure a transmission for the four running system pairs (76) that are placed below of the parallel flat bars framework (67), wherein each running system, in addition to stay very close to each corner of the set, has its own drive mechanism mounted between said bars, each mechanism formed (FIG. 24) by an actuator block (77) mounted in the sliding form in guides (78) and a screw shaft (79), with stops (80) being provided, all of this set being mounted between the parallel bars (67), where the screw shaft (79) has an end coupled to the corresponding axis (70) by means of transmission (81) of pulleys and belts, while at opposite end the sliding block (77) is coupled in the hinged form (82) with a pantographic support defined by a fork (83), in which its median part is fixed in the hinged form (84) to the lower end of a second fork (85), whose upper end is also fixed in the hinged form (86) in the flat bars (67), and in this same axis of the hinge (86) there is a first dual intermediate pulley (87) which, by mean of first belt (88) is coupled to a pulley (89) of a motor (90) and by mean of a second belt (91) is coupled to a second double intermediate pulley (92) mounted in the axis of the hinge (84) of the fork (83), in which the lower end is mounted a wheel in the shape of double pulley (93), having two belts (94) and (95), the first being coupled to the second dual pulley (92) while the second is coupled with the other wheel of dual pulley (93) of the same side, whereby the force of the motor (90) is transmitted to the other sides with other pulleys arranged in the same way, but (FIG. 25) one transmits movement to another through of deviations of corners (96) and respective belts (97).

Figure 26:
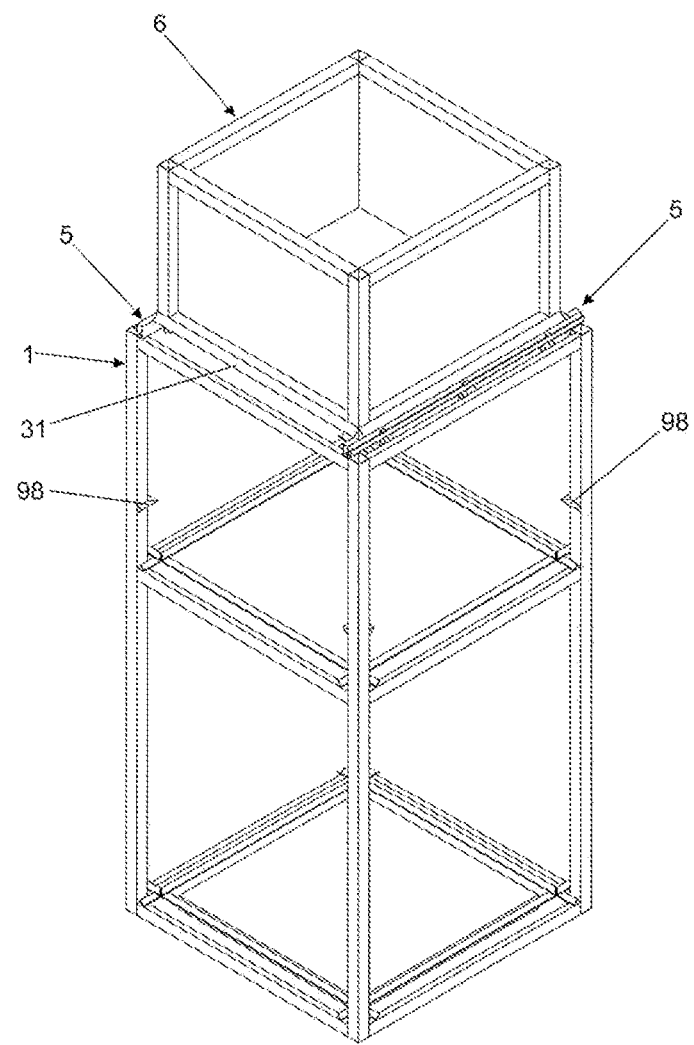
FIG. 26 shows a perspective view of the structure of the modular base highlighting the intermediary supports for arranging a box when it is waiting for the movement robot.
Figure 27:
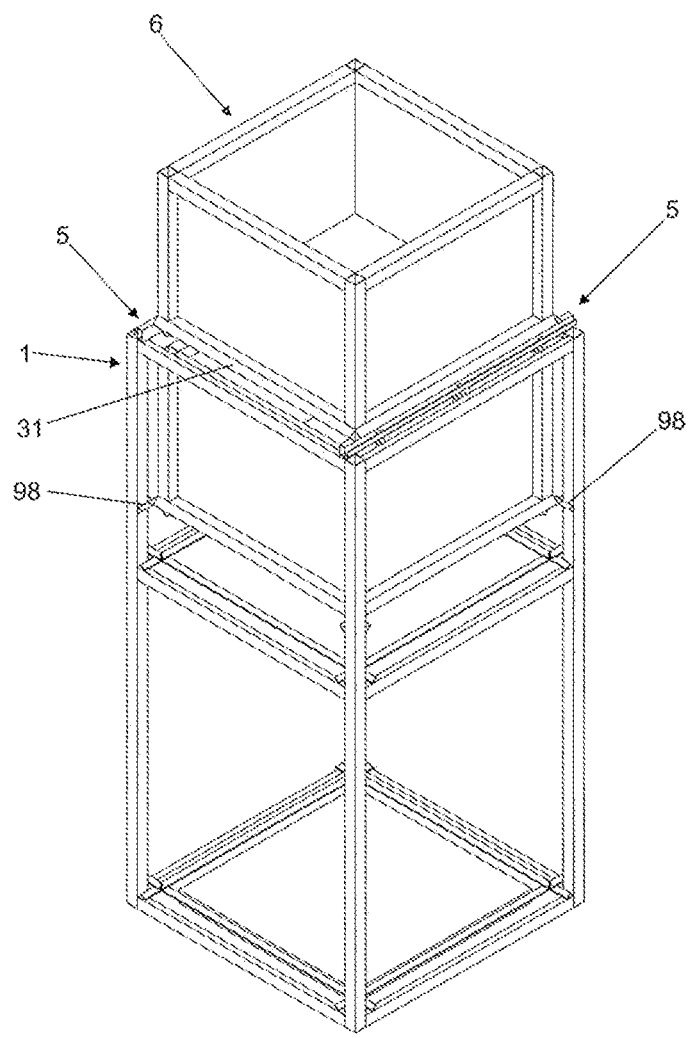
FIG. 27 is a perspective view identical to FIG. 26 of the modular base structure highlighting a box supported on the intermediary supports when it is waiting for the arrival of the movement robot.

Looking at FIGS. 26 and 27 it is noted that the structural module (1) has the first floor (3) provided with waiting supports (98) on which a box (6) is able to be supported by its flap (31) waiting for transport by the movement robot (10).

Figure 28:
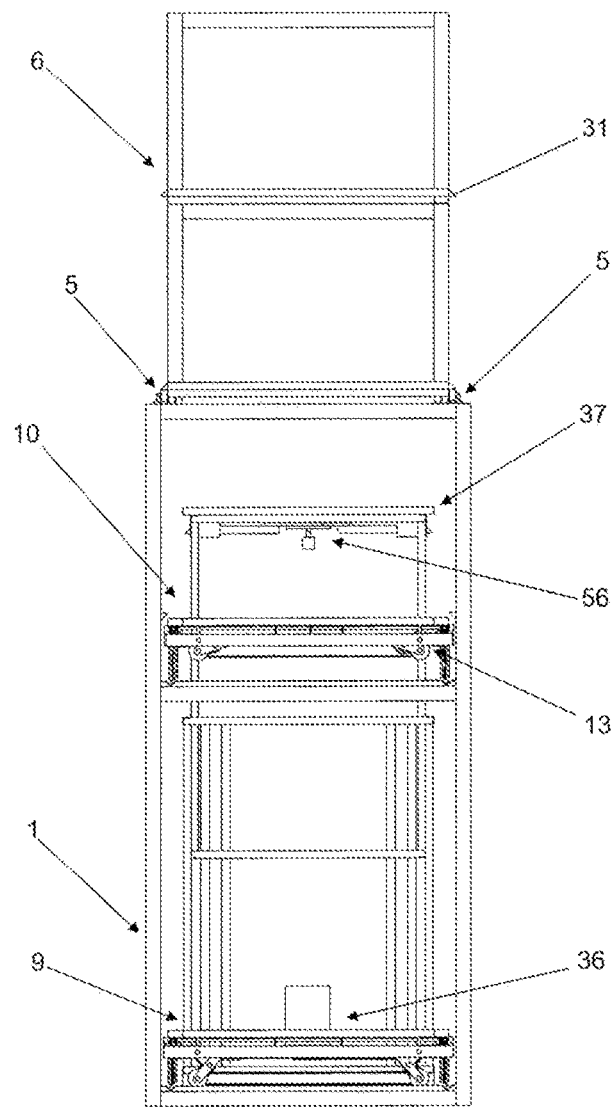
FIG. 28 shows a side view of the modular base showing the upward movement of the movable part of the lifting robot at the moment of fetching a stacked box over the base.
Figure 29:
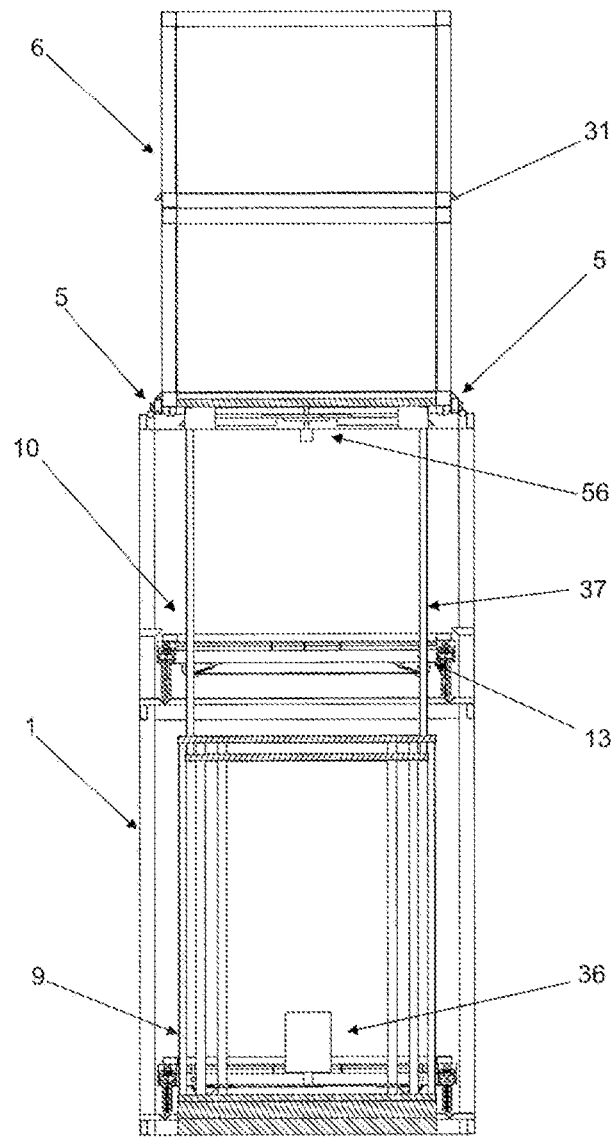
FIG. 29 represents a cross side view showing the final of the stroke of the movable part of the lifting robot and the driving mechanism of the releasing locks of the stacked boxes.
Figure 30:
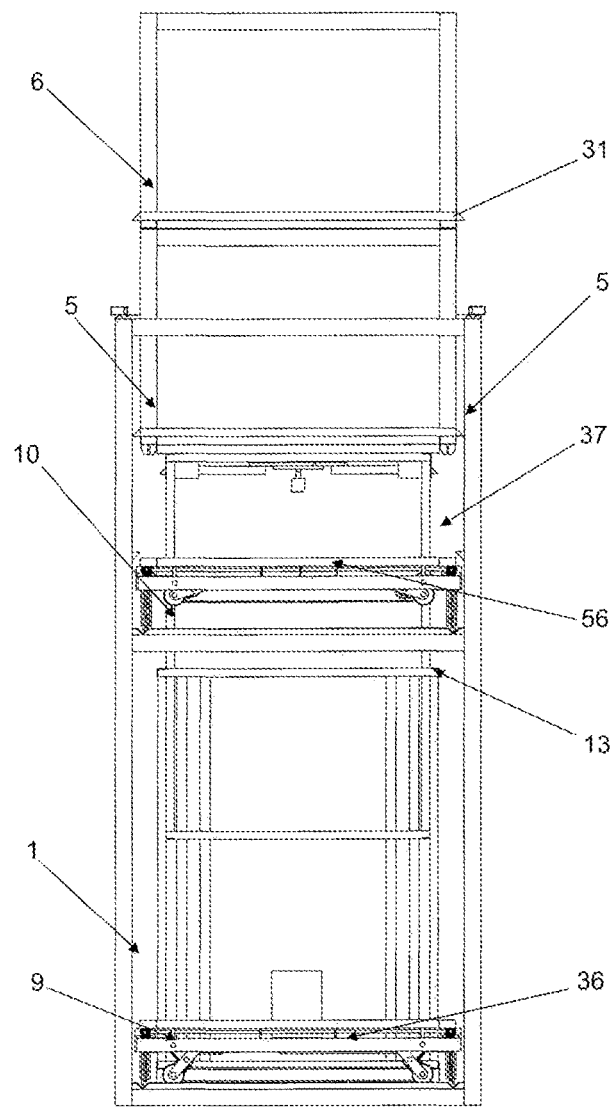
FIG. 30 shows a side view highlighting the descent of the stacked boxes.
Figure 31:
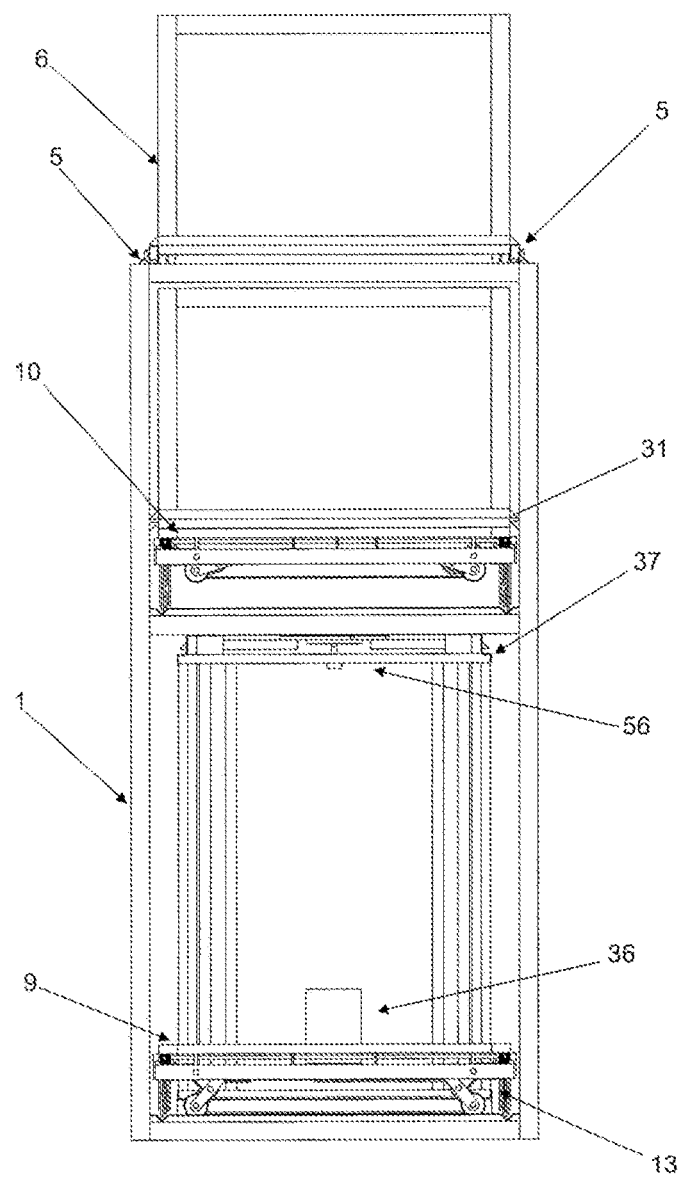
FIG. 31 illustrates a side view showing that a box has been disposed over the movement robot and the remainder of the stacked boxes is supported over the structure of the base.
Figure 32:
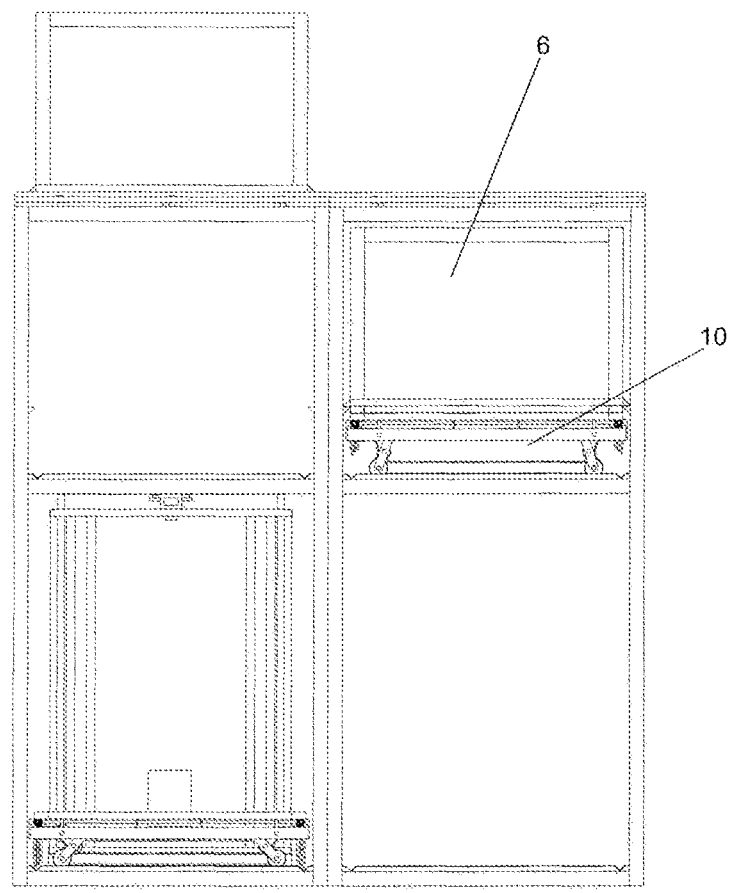
FIG. 32 shows a side view exemplifying the movement of the movement robot with a box supported on it; and the FIG. 33 exposes an isometric view exemplifying the movement of the movement robot with a box supported on it.
Figure 33:
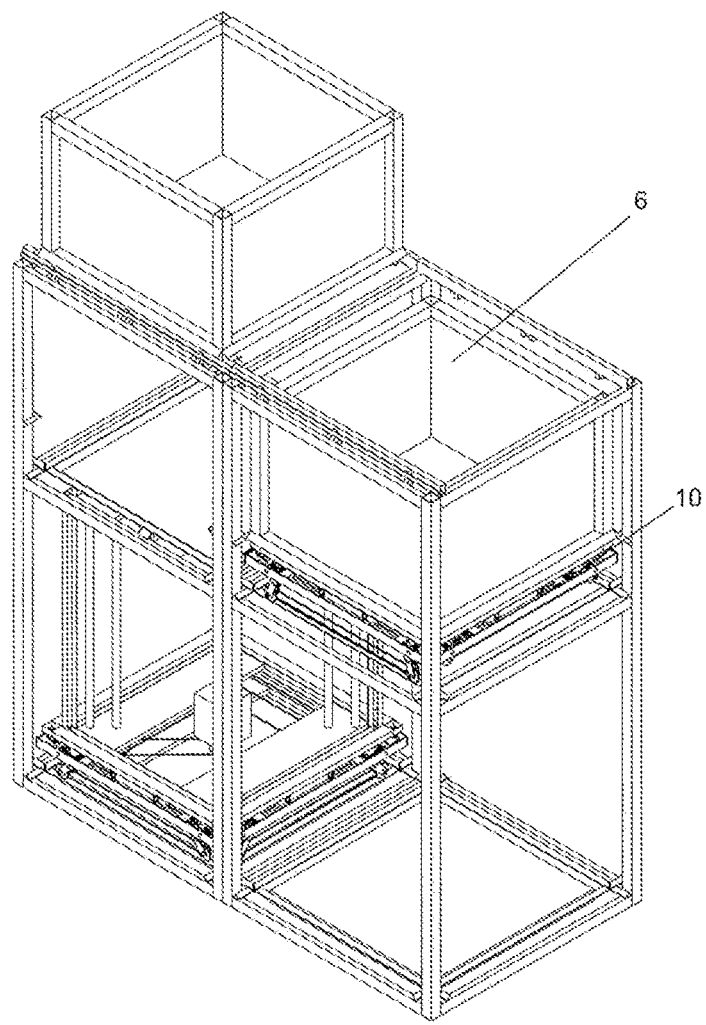

After the modular base is combined with other equals, the operation of all installation (FIGS. 28 and 29) is based on different movements performed by the following components: locks (5), stackable boxes (6), lifting robot (9), movement robot (10) and locking and unlocking mechanism (56), in the other words, considering that one or more stackable boxes (6) are supported over a structural module (1) and, further, the lifting robot (9) and the movement robot (10) are also positioned in this same module (1). In this condition, the lifting robot (9) is driven so that the first box (6) from bottom to up may be carried to any other point of the installation, thus, the mechanism (36) is driven by moving to up the lift (37) until under the first box (6), where it is released by the unlocked mechanism (56) that drives the locks (5), and then, as shown in FIGS. 30 and 31, said lift (37) returns to their original position. In this decline movement, the locks (5) are again driven by own flaps (31) of the corresponding stackable box (6) so that the upper box or the stack of box (6) may be supported again over the module (1), releasing only the first lower box (6). In this condition, this box is simply placed over the movement robot (10) which, at this stage, is already ready to go in any of the four directions defined in each module, as exemplified in FIGS. 32 and 33 and, for this purpose, the trolley (13) collects and lowers the corresponding pairs of running system (76) over the corresponding tracks (8).

Looking at the FIG. (29), it can be noted that all weight defined by the stack of boxes (6) is not transmitted or supported by the running system (76) of the trolley (13), since at this stage of operation all the running systems of said trolley are gathered (raised), consequently all weight of the set is concentrated only in the structure of said trolley (13) and the lift (37) having as support the plinth (18) and the base (39).

Eventually, the box (6), as illustrated in FIG. 27, may be downwardly moved by the lifting robot (9) and be rested on the waiting supports (98). In this operation condition, the movement robot does not have to be present in this module, it may be working in other modules and, at the desired opportunity, this waiting box is gathered by the movement robot (10) to be taken up to any another module.

As has already been said, the running systems (76) move in pairs to up and down, such movement allows that the waiting box (6) to be raised and lowered only the sufficient to be withdrawn or placed over the waiting supports (98). Such operation allows many boxes to be moved from one side to another and placed in corresponding waiting supports (98). This operating condition allows the boxes (6) to be moved from one modulo to the other without the presence of the lifting robot (9).

Therefore, the waiting supports (98) allows that the two robots working independently, which further increases the possibilities of movement of the boxes among the modules.

All the drives are managed by specific software, with different sensors being provided in the corresponding parts and other electronic components, mainly those for wi-fi network, not illustrated, since the object of the invention is a module capable of allowing the assembly of small, medium and large installations, consequently, there are large variations in the use of hardware and software.

A method for storage by stacking and handling of boxes to be carried out by an installation obtained according with the modular structure previously described comprising the basic steps of:

side by side combination of several structural modules (1) for configuring a complete installation which constitutes a structure with three functional pavements, one lower (2) referred as ground floor, one intermediate defined as first floor (3) and one upper defined as support level (4), the latter constitutes a point of support for one or more stacked boxes (6), while the other two pavements (2) and (3) contain the locomotion paths formed by the rails (7) and (8) to the lifting robot (9) and movement robot (10), respectively;

the entrance of the boxes (6) in the installation is made from bottom to up at any point of the perimeter formed by the set, where each box is initially positioned on the movement robot (10) previously positioned in the corresponding module (1), and then, is moved by said robot according to a software-defined route up to another point of the installation, whose destination receives the box (6) in two different ways: a) it is simply placed on the waiting supports (98) releasing the movement robot for new tasks and, at the opportune moment and defined by the software, this box is moved upwards by the lifting robot (9) and placed on the support level (4); b) software synchronizes the arrival of the movement robot (10) loaded with a box (6) and the lifting robot (9) and, this latter, performs the placing of the box on the support level (4) at the moment wherein the locks (5) are driven for finalizing the positioning of the box or its stacking with other existing units in the same module (1); and the rearrangement of the stacked boxes (6) is performed: a) independently of the movement robot (10), the lifting robot (9) performs the destacking of the boxes (6) by moving them one at a time up to the waiting supports (98); b) the boxes (6) maintained in the waiting supports (98) are relocated to the other modules (1) only by the movement robot (10); c) the boxes (6) maintained in the waiting supports (98) are stacked by the lifting robot (9) regardless of the position occupied by the movement robot (10); d) the two robots are synchronized up to the same modulo to perform the destacking or stacking of a box (6).

What is claimed is:

1. Modular base for creating a storage installation for stacking and handling of boxes, comprising:

a vertically elongated structural module having along its height a lower ground floor, an intermediate first floor and an upper support level, said lower ground floor and said intermediate first floor are each provided with four rail segments, wherein at least one lifting robot operates on the four rails of said lower ground floor and at least one movement robot, different from said at least one lifting robot, operates on the four rails of said intermediate first floor;

said at least one movement robot is configured to support at least one box, wherein the at least one lifting robot passes unblocked through a center of the at least one movement robot;

said upper support level has two opposing edges provided with support locks, wherein said at least one box has a flap that drives and releases a support lock during vertical movement of said at least one box;

the at least one lifting robot and the at least one movement robot are each provided with a trolley having a running system on each of four sides of said robot, wherein the running systems move upward and downward so that the running systems of two opposing sides are moved upward while the other two opposing running systems remain placed over a corresponding pair of opposing rail segments allowing said at least one lifting robot and said at least one movement robot to move in four directions and a 90° change of direction over said corresponding pair of opposing rail segments;

said structural module being configured to be coupled with other structural modules so that the rail segments of said lower ground floor and said intermediate first floor of a structural module are aligned with the rail segments of said lower ground floor and said intermediate first floor of another structural module so that the at least one lifting robot and the at least one movement robot move in four directions inside the coupled structural modules to move said at least one box only between said intermediate first floor and said upper support level.

2. The modular base of claim 1, wherein said structural module is made of four tubular vertical columns, each provided at a corner of said structural module and tubular horizontal crossbars interconnecting said four tubular vertical columns to define said lower ground floor, said intermediate first floor and said upper support level, wherein ends of said four rail segments are supported on said tubular horizontal crossbars, said support locks are supported on two opposing tubular horizontal crossbars of the intermediate first floor and said at least one lifting robot is supported on a support plinth provided on the tubular horizontal crossbars of said lower ground floor.

3. The modular base of claim 2, wherein each support lock is formed by a rectangular tube bar that extends along said tubular horizontal crossbar of the upper support level, said rectangular tube bar has a solidary tip provided at a lower part of said rectangular tube bar; said tubular horizontal crossbar of the upper support level is hinged to said rectangular tube bar so that in a first position said rectangular tube bar stays juxtaposed over the tubular horizontal crossbar while the solidary tip lies horizontally towards the inside of said upper support level and in a second position, 90° apart from said first position, said rectangular tube bar is displaced towards the inside of said upper support level forming a support bracket for the flap of said at least one box, wherein said rectangular tube bar is provided with two mass centers that change the center of gravity of said rectangular tube bar maintaining said rectangular tube bar in either the first or second position.

4. The modular base of claim 1, wherein said at least one box has at least one open side and is formed by horizontal square tubes defining an upper framework and a lower framework interconnected by vertical columns at four corners of said frameworks so that an inner plate is provided on sides of said at least one box, each of said vertical columns has an upper end provided with a conducting fitting and a lower end provided with a tip that is configured to be inserted into a conducting fitting of another box when stacked together; said lower framework comprises said flap having a horizontal side supports said at least one box over said support lock and an inclined side that drives and releases said support lock during vertical movement of the at least one box.

5. The modular base of claim 1, wherein said four rail segments are V-shaped angle bars.

6. The modular base of claim 1, wherein the at least one lifting robot comprises a driving mechanism inside a structural cage that is contained inside the lower ground floor, wherein said driving mechanism moves a lifting set vertically to move said at least one box from the intermediate first floor to the upper support level, and vice versa, and to place or remove said at least one box from said at least one movement robot; said trolley of the at least one lifting robot is provided on a lower part of said structural cage.

7. The modular base of claim 6, wherein said structural cage comprises a lower frame and an upper frame made of horizontal angle bars and vertical angle bars interconnecting the lower frame to the upper frame; the lower frame and the upper frame are provided with upper plates and lower plates, respectively, to secure vertical guides and rotating screw shafts of said driving mechanism, wherein the rotating screw shafts have a lower end provided with a pulley so that the rotating screw shafts are synchronized by belts connected between the rotating screw shafts and another belt is provided to couple one of said rotating screw shafts to a bi-directional motor providing simultaneous rotation of all of the rotating screw shafts where the lifting set is coupled.

8. The modular base of claim 7, wherein the lifting set comprises a lower frame and an upper frame made of horizontal angle bars and vertical angle bars interconnecting the lower frame to the upper frame of the lifting set, said upper frame of the lifting set includes a lid where a locking and unlocking mechanism is provided to actuate said support lock and said lower frame has plates including smooth holes slidably receiving the vertical guides and threaded holes receiving the rotating screw shaft, said lower frame of the lifting set is positioned below the upper frame of said structural cage and said upper frame and the lid of said lifting set move above the upper frame of said structural cage so that the vertical angle bars of said lifting set pass by interstices provided on the structural cage.

9. The modular base of claim 8, wherein said locking and unlocking mechanism is positioned below said lid and comprises a bi-directional servo motor having a central shaft coupled to a disc that is coupled to proximal ends of two radially opposing actuating nozzles, said two radially opposing actuating nozzles having wedge-shaped distal ends that are exposed or retracted when the servo motor is actuated so that said wedge-shaped distal ends move said support locks to an unlocked position during unstacking of the at least one box and the flap of said at least one box moves said support lock to a locked position where the support lock serves as a support for a box positioned immediately above said at least one box.

10. The modular base of claim 9, wherein the flaps of a new box to be stacked move said support locks to the unlocked position allowing unblocked passage of said new box and the wedge-shaped distal ends are actuated during downward movement of the lifting set to move said support locks to the locked position.

11. The modular base of claim 1, wherein each trolley comprises an upper frame made of tubes and a lower frame made or parallel vertical flat bars, said upper frame is supported and secured over spacer supports that are also secured to the parallel flat bars; the spacer supports serve as bearings for an axis provided on each side of the trolley, ends of said axis has conical gears interconnecting all the axes together and one of the axis is driven by a motor coupled to a first pully which in turn is coupled to a second pully by a belt transmission, wherein the axes configure a transmission for the running systems.

12. The modular base of claim 11, wherein each running system has a drive mechanism formed by an actuator block slidably mounted on guides and a screw shaft with stops where the screw shaft has an end coupled to a corresponding axis by a pulley and belt arrangement and an end of the actuator block is hinged to a pantographic support which in turn is hinged to a lower end of a fork having an upper end hinged to said vertical flat bars.

13. The modular base of claim 12, wherein a first dual intermediate pulley is coupled to said upper end of the fork, a pulley (89) of a motor (90) is coupled to said first dual intermediate pulley by a first belt and a second belt couples said first dual intermediate pulley to a second double intermediate pulley (92) coupled to the hinged lower end of the fork, wherein a wheel having a double pulley is provided on a lower end of said pantographic support so that a first belt couples said double pulley of the wheel to said second double intermediate pulley (92) and a second belt couples said double pulley of the wheel with a dual pulley of another wheel of a corresponding running system so that a movement of the motor is transmitted to all the pulleys that are connected on a same running system.

14. The modular base of claim 13, wherein the movement of said motor is transmitted to a pulley located on a different running system by a belt provided around a corner defined by two contiguous running systems of said trolley.

15. The modular base of claim 11, wherein the upper frame of the trolley of said at least one movement robot has corner receptacles configured to receive the tip of the at least on box.

16. The modular base of claim 1, wherein the intermediate first floor is provided with waiting supports configured to support the flap of a box to be transported by the at least one movement robot.

17. A method for creating a storage installation with the modular structure of claim 1, the method comprises the steps of:
positioning side-by-side a plurality of structural modules to configure a storage installation having an installation lower ground floor, an installation intermediate first floor and an installation upper support level, wherein said installation lower ground floor has lower ground rail segments providing movement paths to said at least one lifting robot across said plurality of structural modules, said installation intermediate first floor has intermediate ground rail segments providing movement paths to said at least one movement robot across said plurality of structural modules and said installation upper support level is configured to support at least one box;
positioning said at least one box on the at least one movement robot inside the installation intermediate first floor and moving said at least one box to a location on said installation upper support level by either:
 a) moving said at least one movement robot and placing said at least one box on waiting supports of a structural module, releasing said at least one robot to perform a new task, and actuating at a later time said at least one lifting robot to move said at least one box upwards to an upper support level of that same structural module, or
 b) synchronizing an arrival of the at least one movement robot to a structural module with the actuation of the at least one lifting robot of that same structural module so that said at least one lifting robot places the at least one box on the upper support level of that same structural module, wherein the support locks are driven to secure and support said at least one box on the upper support level; and
rearranging the at least one box by:
 a) moving and positioning said at least one box to said waiting supports with the at least one lifting robot, independently of said at least one movement robot;
 b) relocating with only said at least one movement robot said at least one box maintained in the waiting supports to another structural module; and
 c) stacking any box maintained in the waiting supports by moving said at least one lifting robot regardless of the position occupied by the at least one movement robot inside the storage installation, wherein said at least one lifting robot and said at least one movement robot are synchronized to reach a same structural module to perform stacking and unstacking of a box.

* * * * *